(12) United States Patent
Yeung et al.

(10) Patent No.: US 11,174,716 B1
(45) Date of Patent: *Nov. 16, 2021

(54) DRIVE EQUIPMENT AND METHODS FOR MOBILE FRACTURING TRANSPORTATION PLATFORMS

(71) Applicant: BJ Energy Solutions, LLC, Houston, TX (US)

(72) Inventors: Tony Yeung, Houston, TX (US); Ricardo Rodriguez-Ramon, Houston, TX (US); Joseph Foster, Houston, TX (US)

(73) Assignee: BJ Energy Solutions, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/377,884

(22) Filed: Jul. 16, 2021

Related U.S. Application Data

(62) Division of application No. 17/301,305, filed on Mar. 21, 2021, now Pat. No. 11,111,768.

(Continued)

(51) Int. Cl.
*F01D 15/10* (2006.01)
*E21B 43/26* (2006.01)
(Continued)

(52) U.S. Cl.
CPC .......... *E21B 43/2607* (2020.05); *F01D 15/08* (2013.01); *F01D 15/10* (2013.01); *F02C 7/36* (2013.01); *F04B 17/03* (2013.01)

(58) Field of Classification Search
CPC .. F01D 15/08–12; E21B 43/2607; F02C 7/36; F04B 17/03; B60P 3/00
See application file for complete search history.

(56) References Cited

U.S. PATENT DOCUMENTS 2,498,229 A 2/1950 Adler
3,068,796 A 12/1962 Pfluger et al.
(Continued)

FOREIGN PATENT DOCUMENTS

CA 2876687 A1 5/2014
CA 2876687 C 4/2019
(Continued)

OTHER PUBLICATIONS

SPM® QEM 5000 E-Frac Pump Specification Sheet, Weir Group (2019) ("Weir 5000").

(Continued)

*Primary Examiner* — Arun Goyal
(74) *Attorney, Agent, or Firm* — Womble Bond Dickinson (US) LLP

(57) ABSTRACT

Embodiments of drive equipment for mobile hydraulic fracturing power units and methods for changing and controlling the drive equipment are disclosed. The mobile power units include a gas turbine engine that provides mechanical power to drive shaft which is connected to the drive equipment such that the drive equipment is driven by the engine. The drive equipment may be a hydraulic fracturing pump or an electrical generator. The drive shaft is rotated at a speed suitable for the hydraulic fracturing pump and the electrical generator includes a step up gearbox to increase a rotational speed of the drive shaft for use by the electrical generator. The drive equipment may be secured to a skid that is field changeable with a crane or a fork lift to change the drive equipment at a well pad based on the demands of the well pad.

7 Claims, 7 Drawing Sheets

Related U.S. Application Data

(60) Provisional application No. 62/705,055, filed on Jun. 9, 2020.

(51) Int. Cl.
  *F04B 17/03* (2006.01)
  *F01D 15/08* (2006.01)
  *F02C 7/36* (2006.01)

(56) References Cited

U.S. PATENT DOCUMENTS

| | | |
|---|---|---|
| 3,191,517 A | 6/1965 | Solzman |
| 3,257,031 A | 6/1966 | Dietz |
| 3,378,074 A | 4/1968 | Kiel |
| 3,550,696 A | 12/1970 | Kenneday |
| 3,739,872 A | 6/1973 | McNair |
| 3,773,438 A | 11/1973 | Hall et al. |
| 3,786,835 A | 1/1974 | Finger |
| 3,791,682 A | 2/1974 | Mitchell |
| 3,796,045 A | 3/1974 | Foster |
| 3,820,922 A | 6/1974 | Buse et al. |
| 4,010,613 A | 3/1977 | McInerney |
| 4,031,407 A | 6/1977 | Reed |
| 4,086,976 A | 5/1978 | Holm et al. |
| 4,204,808 A | 5/1980 | Reese et al. |
| 4,222,229 A | 9/1980 | Uram |
| 4,269,569 A | 5/1981 | Hoover |
| 4,311,395 A | 1/1982 | Douthitt et al. |
| 4,330,237 A | 5/1982 | Battah |
| 4,357,027 A | 11/1982 | Zeitlow |
| 4,402,504 A | 9/1983 | Christian |
| 4,457,325 A | 7/1984 | Green |
| 4,470,771 A | 9/1984 | Hall et al. |
| 4,483,684 A | 11/1984 | Black |
| 4,574,880 A | 3/1986 | Handke |
| 4,584,654 A | 4/1986 | Crane |
| 4,754,607 A | 7/1988 | Mackay |
| 4,782,244 A | 11/1988 | Wakimoto |
| 4,796,777 A | 1/1989 | Keller |
| 4,913,625 A | 4/1990 | Gerlowski |
| 4,983,259 A | 1/1991 | Duncan |
| 4,990,058 A | 2/1991 | Eslinger |
| 5,135,361 A | 8/1992 | Dion |
| 5,537,813 A | 7/1996 | Davis et al. |
| 5,553,514 A | 9/1996 | Walkowc |
| 5,560,195 A | 10/1996 | Anderson et al. |
| 5,586,444 A | 12/1996 | Fung |
| 5,622,245 A | 4/1997 | Reik |
| 5,651,400 A | 7/1997 | Corts et al. |
| 5,678,460 A | 10/1997 | Walkowc |
| 5,717,172 A | 2/1998 | Griffin, Jr. et al. |
| 5,983,962 A | 11/1999 | Gerardot |
| 6,041,856 A | 3/2000 | Thrasher et al. |
| 6,050,080 A | 4/2000 | Horner |
| 6,071,188 A | 6/2000 | O'Neill et al. |
| 6,074,170 A | 6/2000 | Bert et al. |
| 6,123,751 A | 9/2000 | Nelson et al. |
| 6,129,335 A | 10/2000 | Yokogi |
| 6,145,318 A | 11/2000 | Kaplan et al. |
| 6,230,481 B1 | 5/2001 | Jahr |
| 6,279,309 B1 | 8/2001 | Lawlor, II et al. |
| 6,321,860 B1 | 11/2001 | Reddoch |
| 6,334,746 B1 | 1/2002 | Nguyen et al. |
| 6,530,224 B1 | 3/2003 | Conchieri |
| 6,543,395 B2 | 4/2003 | Green |
| 6,655,922 B1 | 12/2003 | Flek |
| 6,765,304 B2 | 7/2004 | Baten et al. |
| 6,786,051 B2 | 9/2004 | Kristich et al. |
| 6,851,514 B2 | 2/2005 | Han et al. |
| 6,859,740 B2 | 2/2005 | Stephenson et al. |
| 6,901,735 B2 | 6/2005 | Lohn |
| 7,065,953 B1 | 6/2006 | Kopko |
| 7,143,016 B1 | 11/2006 | Discenzo et al. |
| 7,222,015 B2 | 5/2007 | Davis et al. |
| 7,388,303 B2 | 6/2008 | Seiver |
| 7,545,130 B2 | 6/2009 | Latham |
| 7,552,903 B2 | 6/2009 | Dunn et al. |
| 7,563,076 B2 | 7/2009 | Brunet et al. |
| 7,627,416 B2 | 12/2009 | Batenburg et al. |
| 7,677,316 B2 | 3/2010 | Butler et al. |
| 7,721,521 B2 | 5/2010 | Kunkle et al. |
| 7,730,711 B2 | 6/2010 | Kunkle et al. |
| 7,845,413 B2 | 12/2010 | Shampine et al. |
| 7,900,724 B2 | 3/2011 | Promersberger et al. |
| 7,921,914 B2 | 4/2011 | Bruins et al. |
| 7,938,151 B2 | 5/2011 | Höckner |
| 7,980,357 B2 | 7/2011 | Edwards |
| 8,083,504 B2 | 12/2011 | Williams et al. |
| 8,186,334 B2 | 5/2012 | Ooyama |
| 8,196,555 B2 | 6/2012 | Ikeda et al. |
| 8,316,936 B2 | 11/2012 | Roddyetai. |
| 8,414,673 B2 | 4/2013 | Raje et al. |
| 8,506,267 B2 | 8/2013 | Gambier et al. |
| 8,575,873 B2 | 11/2013 | Peterson et al. |
| 8,616,005 B1 | 12/2013 | Cousino, Sr. et al. |
| 8,621,873 B2 | 1/2014 | Robertson et al. |
| 8,672,606 B2 | 3/2014 | Glynn et al. |
| 8,714,253 B2 | 5/2014 | Sherwood et al. |
| 8,757,918 B2 * | 6/2014 | Ramnarain ............ F04B 39/14 403/321 |
| 8,770,329 B2 | 7/2014 | Spitler |
| 8,789,601 B2 | 7/2014 | Broussard et al. |
| 8,794,307 B2 | 8/2014 | Coquilleau et al. |
| 8,801,394 B2 | 8/2014 | Anderson |
| 8,851,441 B2 | 10/2014 | Acuna et al. |
| 8,905,056 B2 | 12/2014 | Kendrick |
| 8,973,560 B2 | 3/2015 | Krug |
| 8,997,904 B2 | 4/2015 | Cryer et al. |
| 9,032,620 B2 | 5/2015 | Frassinelli et al. |
| 9,057,247 B2 | 6/2015 | Kumar et al. |
| 9,103,193 B2 | 8/2015 | Coli et al. |
| 9,121,257 B2 | 9/2015 | Coli et al. |
| 9,140,110 B2 | 9/2015 | Coli et al. |
| 9,187,982 B2 | 11/2015 | Dehring et al. |
| 9,206,667 B2 | 12/2015 | Khvoshchev et al. |
| 9,212,643 B2 | 12/2015 | Deliyski |
| 9,222,346 B1 | 12/2015 | Walls |
| 9,341,055 B2 | 5/2016 | Weightman et al. |
| 9,346,662 B2 | 5/2016 | Van Vliet et al. |
| 9,366,114 B2 | 6/2016 | Coli et al. |
| 9,376,786 B2 | 6/2016 | Numasawa |
| 9,394,829 B2 | 7/2016 | Cabeen et al. |
| 9,395,049 B2 | 7/2016 | Vicknair et al. |
| 9,401,670 B2 | 7/2016 | Minato et al. |
| 9,410,410 B2 | 8/2016 | Broussard et al. |
| 9,410,546 B2 | 8/2016 | Jaeger et al. |
| 9,429,078 B1 | 8/2016 | Crowe et al. |
| 9,488,169 B2 | 11/2016 | Cochran et al. |
| 9,493,997 B2 | 11/2016 | Liu et al. |
| 9,512,783 B2 | 12/2016 | Veilleux et al. |
| 9,534,473 B2 | 1/2017 | Morris et al. |
| 9,546,652 B2 | 1/2017 | Yin |
| 9,550,501 B2 | 1/2017 | Ledbetter |
| 9,556,721 B2 | 1/2017 | Jang et al. |
| 9,562,420 B2 | 2/2017 | Morris et al. |
| 9,570,945 B2 | 2/2017 | Fischer |
| 9,579,980 B2 | 2/2017 | Cryer et al. |
| 9,587,649 B2 | 3/2017 | Oehring |
| 9,611,728 B2 | 4/2017 | Oehring |
| 9,617,808 B2 | 4/2017 | Liu et al. |
| 9,638,101 B1 | 5/2017 | Crowe et al. |
| 9,638,194 B2 | 5/2017 | Wiegman et al. |
| 9,650,871 B2 | 5/2017 | Oehring et al. |
| 9,656,762 B2 | 5/2017 | Kamath et al. |
| 9,689,316 B1 | 6/2017 | Crom |
| 9,739,130 B2 | 8/2017 | Young |
| 9,764,266 B1 | 9/2017 | Carter |
| 9,777,748 B2 | 10/2017 | Lu et al. |
| 9,803,467 B2 | 10/2017 | Tang et al. |
| 9,803,793 B2 | 10/2017 | Davi et al. |
| 9,809,308 B2 | 11/2017 | Aguilar et al. |
| 9,829,002 B2 | 11/2017 | Crom |
| 9,840,897 B2 | 12/2017 | Larson |
| 9,840,901 B2 | 12/2017 | Oering et al. |

(56) References Cited

U.S. PATENT DOCUMENTS

| | | |
|---|---|---|
| 9,850,422 B2 | 12/2017 | Lestz et al. |
| 9,856,131 B1 | 1/2018 | Moffitt |
| 9,863,279 B2 | 1/2018 | Laing et al. |
| 9,869,305 B1 | 1/2018 | Crowe et al. |
| 9,879,609 B1 | 1/2018 | Crowe et al. |
| 9,893,500 B2 | 2/2018 | Oehring et al. |
| 9,893,660 B2 | 2/2018 | Peterson et al. |
| 9,920,615 B2 | 3/2018 | Zhang et al. |
| 9,945,365 B2 | 4/2018 | Hernandez et al. |
| 9,964,052 B2 | 5/2018 | Millican et al. |
| 9,970,278 B2 | 5/2018 | Broussard et al. |
| 9,981,840 B2 | 5/2018 | Shock |
| 9,995,102 B2 | 6/2018 | Dillie et al. |
| 9,995,218 B2 | 6/2018 | Oehring et al. |
| 10,008,880 B2 | 6/2018 | Vicknair et al. |
| 10,008,912 B2 | 6/2018 | Davey et al. |
| 10,018,096 B2 | 7/2018 | Wallimann et al. |
| 10,020,711 B2 | 7/2018 | Oehring et al. |
| 10,024,123 B2 | 7/2018 | Steffenhagen et al. |
| 10,029,289 B2 | 7/2018 | Wendorski et al. |
| 10,030,579 B2 | 7/2018 | Austin et al. |
| 10,036,238 B2 | 7/2018 | Oehring |
| 10,040,541 B2 | 8/2018 | Wilson et al. |
| 10,060,293 B2 * | 8/2018 | Del Bono ............... F16M 9/00 |
| 10,060,349 B2 | 8/2018 | Álvarez et al. |
| 10,082,137 B2 | 9/2018 | Graham et al. |
| 10,094,366 B2 | 10/2018 | Marica |
| 10,100,827 B2 | 10/2018 | Devan et al. |
| 10,107,084 B2 | 10/2018 | Coli et al. |
| 10,107,085 B2 | 10/2018 | Coli et al. |
| 10,114,061 B2 | 10/2018 | Frampton et al. |
| 10,119,381 B2 | 11/2018 | Oehring et al. |
| 10,134,257 B2 | 11/2018 | Zhang et al. |
| 10,138,098 B2 | 11/2018 | Sorensen et al. |
| 10,151,244 B2 | 12/2018 | Giancotti et al. |
| 10,174,599 B2 | 1/2019 | Shampine et al. |
| 10,184,397 B2 | 1/2019 | Austin et al. |
| 10,196,258 B2 | 2/2019 | Kalala et al. |
| 10,221,856 B2 | 3/2019 | Hernandez et al. |
| 10,227,854 B2 | 3/2019 | Glass |
| 10,227,855 B2 | 3/2019 | Coli et al. |
| 10,246,984 B2 | 4/2019 | Payne et al. |
| 10,247,182 B2 | 4/2019 | Zhang et al. |
| 10,254,732 B2 | 4/2019 | Oehring et al. |
| 10,267,439 B2 | 4/2019 | Pryce et al. |
| 10,280,724 B2 | 5/2019 | Hinderliter |
| 10,287,943 B1 | 5/2019 | Schiltz |
| 10,303,190 B2 | 5/2019 | Shock |
| 10,316,832 B2 | 6/2019 | Byrne |
| 10,317,875 B2 | 6/2019 | Pandurangan |
| 10,337,402 B2 | 7/2019 | Austin et al. |
| 10,358,035 B2 | 7/2019 | Cryer |
| 10,371,012 B2 | 8/2019 | Davis et al. |
| 10,374,485 B2 | 8/2019 | Morris et al. |
| 10,378,326 B2 | 8/2019 | Morris et al. |
| 10,393,108 B2 | 8/2019 | Chong et al. |
| 10,407,990 B2 | 9/2019 | Oehring et al. |
| 10,408,031 B2 | 9/2019 | Oehring et al. |
| 10,415,348 B2 | 9/2019 | Zhang et al. |
| 10,415,557 B1 | 9/2019 | Crowe et al. |
| 10,415,562 B2 | 9/2019 | Kajita et al. |
| RE47,695 E | 11/2019 | Case et al. |
| 10,465,689 B2 | 11/2019 | Crom |
| 10,478,753 B1 | 11/2019 | Elms et al. |
| 10,526,882 B2 | 1/2020 | Oehring et al. |
| 10,563,649 B2 | 2/2020 | Zhang et al. |
| 10,577,910 B2 | 3/2020 | Stephenson |
| 10,598,258 B2 | 3/2020 | Oehring et al. |
| 10,610,842 B2 | 4/2020 | Chong |
| 10,711,787 B1 | 7/2020 | Darley |
| 10,738,580 B1 | 8/2020 | Fischer et al. |
| 10,753,153 B1 | 8/2020 | Fischer et al. |
| 10,753,165 B1 | 8/2020 | Fischer et al. |
| 10,794,165 B2 | 10/2020 | Fischer et al. |
| 10,794,166 B2 | 10/2020 | Reckels et al. |
| 10,801,311 B1 | 10/2020 | Cui et al. |
| 10,815,764 B1 | 10/2020 | Yeung et al. |
| 10,815,978 B2 | 10/2020 | Glass |
| 10,830,032 B1 | 11/2020 | Zhang et al. |
| 10,865,624 B1 | 12/2020 | Cui et al. |
| 10,865,631 B1 | 12/2020 | Zhang et al. |
| 10,895,202 B1 | 1/2021 | Yeung et al. |
| 10,907,459 B1 | 2/2021 | Yeung et al. |
| 10,927,774 B2 | 2/2021 | Cai et al. |
| 10,954,770 B1 | 3/2021 | Yeung et al. |
| 10,961,908 B1 | 3/2021 | Yeung et al. |
| 10,961,912 B1 | 3/2021 | Yeung et al. |
| 10,961,914 B1 | 3/2021 | Yeung et al. |
| 10,982,523 B1 | 4/2021 | Hill et al. |
| 10,989,019 B2 | 4/2021 | Cai et al. |
| 10,995,564 B2 | 5/2021 | Miller et al. |
| 11,035,214 B2 | 6/2021 | Cui et al. |
| 11,053,853 B2 | 7/2021 | Li et al. |
| 2004/0016245 A1 | 1/2004 | Pierson |
| 2004/0187950 A1 | 9/2004 | Cohen et al. |
| 2005/0139286 A1 | 6/2005 | Poulter |
| 2005/0226754 A1 | 10/2005 | Orr et al. |
| 2006/0061091 A1 | 3/2006 | Osterloh |
| 2006/0062914 A1 | 3/2006 | Garg et al. |
| 2006/0260331 A1 | 11/2006 | Andreychuk |
| 2007/0029090 A1 | 2/2007 | Andreychuk et al. |
| 2007/0066406 A1 | 3/2007 | Keller et al. |
| 2007/0107981 A1 | 5/2007 | Sicotte |
| 2007/0125544 A1 | 6/2007 | Robinson et al. |
| 2007/0181212 A1 | 8/2007 | Fell |
| 2007/0277982 A1 | 12/2007 | Shampine et al. |
| 2007/0295569 A1 | 12/2007 | Manzoor et al. |
| 2008/0098891 A1 | 5/2008 | Feher |
| 2008/0161974 A1 | 7/2008 | Alston |
| 2008/0264625 A1 | 10/2008 | Ochoa |
| 2008/0264649 A1 | 10/2008 | Crawford |
| 2009/0064685 A1 | 3/2009 | Busekros et al. |
| 2009/0124191 A1 | 5/2009 | Becelaere et al. |
| 2010/0071899 A1 | 3/2010 | Coquilleau et al. |
| 2010/0218508 A1 | 9/2010 | Brown et al. |
| 2010/0300683 A1 | 12/2010 | Looper et al. |
| 2010/0310384 A1 | 12/2010 | Stephenson et al. |
| 2011/0052423 A1 | 3/2011 | Gambier et al. |
| 2011/0054704 A1 | 3/2011 | Karpman et al. |
| 2011/0085924 A1 | 4/2011 | Shampine et al. |
| 2011/0197988 A1 | 8/2011 | Van Vliet et al. |
| 2011/0241888 A1 | 10/2011 | Lu et al. |
| 2011/0265443 A1 | 11/2011 | Ansari |
| 2011/0272158 A1 | 11/2011 | Neal |
| 2012/0048242 A1 | 3/2012 | Sumilla et al. |
| 2012/0179444 A1 | 7/2012 | Ganguly et al. |
| 2012/0199001 A1 | 8/2012 | Chillar et al. |
| 2012/0204627 A1 | 8/2012 | Anderl et al. |
| 2012/0310509 A1 | 12/2012 | Pardo et al. |
| 2013/0068307 A1 | 3/2013 | Hains et al. |
| 2013/0087045 A1 | 4/2013 | Sullivan et al. |
| 2013/0087945 A1 | 4/2013 | Kusters et al. |
| 2013/0259707 A1 | 10/2013 | Yin |
| 2013/0284455 A1 | 10/2013 | Kajaria et al. |
| 2013/0300341 A1 | 11/2013 | Gillette |
| 2013/0306322 A1 | 11/2013 | Sanborn |
| 2014/0013768 A1 | 1/2014 | Laing et al. |
| 2014/0044517 A1 | 2/2014 | Saha et al. |
| 2014/0048253 A1 | 2/2014 | Andreychuk |
| 2014/0090729 A1 | 4/2014 | Coulter et al. |
| 2014/0090742 A1 | 4/2014 | Coskrey et al. |
| 2014/0094105 A1 | 4/2014 | Lundh et al. |
| 2014/0130422 A1 | 5/2014 | Laing et al. |
| 2014/0147291 A1 | 5/2014 | Burnette |
| 2014/0216736 A1 | 8/2014 | Leugemors et al. |
| 2014/0277772 A1 | 9/2014 | Lopez et al. |
| 2014/0290266 A1 | 10/2014 | Veilleux, Jr. et al. |
| 2014/0318638 A1 | 10/2014 | Harwood et al. |
| 2015/0078924 A1 | 3/2015 | Zhang et al. |
| 2015/0101344 A1 | 4/2015 | Jarrier et al. |
| 2015/0114652 A1 | 4/2015 | Lestz et al. |
| 2015/0129210 A1 | 5/2015 | Chong et al. |
| 2015/0135659 A1 | 5/2015 | Jarrier et al. |
| 2015/0159553 A1 | 6/2015 | Kippel et al. |

(56) References Cited

U.S. PATENT DOCUMENTS

| | | |
|---|---|---|
| 2015/0192117 A1 | 7/2015 | Bridges |
| 2015/0204148 A1 | 7/2015 | Liu et al. |
| 2015/0204322 A1 | 7/2015 | Iund et al. |
| 2015/0211512 A1 | 7/2015 | Wiegman et al. |
| 2015/0217672 A1 | 8/2015 | Shampine et al. |
| 2015/0252661 A1 | 9/2015 | Glass |
| 2015/0275891 A1 | 10/2015 | Chong et al. |
| 2015/0340864 A1 | 11/2015 | Compton |
| 2015/0345385 A1 | 12/2015 | Santini |
| 2015/0369351 A1 | 12/2015 | Hermann et al. |
| 2016/0032703 A1 | 2/2016 | Broussard et al. |
| 2016/0102581 A1 | 4/2016 | Del Bono |
| 2016/0105022 A1 | 4/2016 | Oehring et al. |
| 2016/0108713 A1 | 4/2016 | Dunaeva et al. |
| 2016/0177675 A1 | 6/2016 | Morris et al. |
| 2016/0186671 A1 | 6/2016 | Austin et al. |
| 2016/0195082 A1 | 7/2016 | Wiegman et al. |
| 2016/0215774 A1 | 7/2016 | Oklejas et al. |
| 2016/0230525 A1 | 8/2016 | Lestz et al. |
| 2016/0244314 A1 | 8/2016 | Van Vliet et al. |
| 2016/0248230 A1 | 8/2016 | Tawy et al. |
| 2016/0253634 A1 | 9/2016 | Thomeer et al. |
| 2016/0258267 A1 | 9/2016 | Payne et al. |
| 2016/0273346 A1 | 9/2016 | Tang et al. |
| 2016/0290114 A1 | 10/2016 | Oehring et al. |
| 2016/0319650 A1 | 11/2016 | Oehring et al. |
| 2016/0326845 A1 | 11/2016 | Djikpesse et al. |
| 2016/0348479 A1 | 12/2016 | Oehring et al. |
| 2016/0369609 A1 | 12/2016 | Morris et al. |
| 2017/0009905 A1 | 1/2017 | Arnold |
| 2017/0016433 A1 | 1/2017 | Chong et al. |
| 2017/0030177 A1 | 2/2017 | Oehring et al. |
| 2017/0038137 A1 | 2/2017 | Turney |
| 2017/0074076 A1 | 3/2017 | Joseph et al. |
| 2017/0074089 A1 | 3/2017 | Agarwal et al. |
| 2017/0082110 A1 | 3/2017 | Lammers |
| 2017/0089189 A1 | 3/2017 | Norris et al. |
| 2017/0114613 A1 | 4/2017 | Lecerf et al. |
| 2017/0114625 A1 | 4/2017 | Norris et al. |
| 2017/0145918 A1 | 5/2017 | Oehring et al. |
| 2017/0191350 A1 | 7/2017 | Johns et al. |
| 2017/0218727 A1 | 8/2017 | Oehring et al. |
| 2017/0226839 A1 | 8/2017 | Broussard et al. |
| 2017/0226998 A1 | 8/2017 | Zhang et al. |
| 2017/0227002 A1 | 8/2017 | Mikulski et al. |
| 2017/0234165 A1 | 8/2017 | Kersey et al. |
| 2017/0234308 A1 | 8/2017 | Buckley |
| 2017/0248034 A1 | 8/2017 | Dzieciol et al. |
| 2017/0275149 A1 | 9/2017 | Schmidt |
| 2017/0292409 A1 | 10/2017 | Aguilar et al. |
| 2017/0302135 A1 | 10/2017 | Cory |
| 2017/0305736 A1 | 10/2017 | Haile et al. |
| 2017/0322086 A1 | 11/2017 | Luharuka |
| 2017/0334448 A1 | 11/2017 | Schwunk |
| 2017/0335842 A1 | 11/2017 | Robinson et al. |
| 2017/0350471 A1 | 12/2017 | Steidl et al. |
| 2017/0370199 A1 | 12/2017 | Witkowski et al. |
| 2017/0370480 A1 | 12/2017 | Witkowski et al. |
| 2018/0034280 A1 | 2/2018 | Pedersen |
| 2018/0038328 A1 | 2/2018 | Louven et al. |
| 2018/0041093 A1 | 2/2018 | Miranda |
| 2018/0045202 A1 | 2/2018 | Crom |
| 2018/0038216 A1 | 3/2018 | Zhang et al. |
| 2018/0058171 A1 | 3/2018 | Roesner et al. |
| 2018/0156210 A1 | 6/2018 | Oehring et al. |
| 2018/0172294 A1 | 6/2018 | Owen |
| 2018/0183219 A1 | 6/2018 | Oehring et al. |
| 2018/0186442 A1 | 7/2018 | Maier |
| 2018/0187662 A1 | 7/2018 | Hill et al. |
| 2018/0209415 A1 | 7/2018 | Zhang et al. |
| 2018/0223640 A1 | 8/2018 | Keihany et al. |
| 2018/0224044 A1 | 8/2018 | Penney |
| 2018/0229998 A1 | 8/2018 | Shock |
| 2018/0258746 A1 | 9/2018 | Broussard et al. |
| 2018/0266412 A1 | 9/2018 | Stokkevag et al. |
| 2018/0278124 A1 | 9/2018 | Oehring et al. |
| 2018/0283102 A1 | 10/2018 | Cook |
| 2018/0283618 A1 | 10/2018 | Cook |
| 2018/0284817 A1 | 10/2018 | Cook et al. |
| 2018/0290877 A1 | 10/2018 | Shock |
| 2018/0291781 A1 | 10/2018 | Pedrini |
| 2018/0298731 A1 | 10/2018 | Bishop |
| 2018/0298735 A1 | 10/2018 | Conrad |
| 2018/0307255 A1 | 10/2018 | Bishop |
| 2018/0328157 A1 | 11/2018 | Bishop |
| 2018/0334893 A1 | 11/2018 | Oehring |
| 2018/0363435 A1 | 12/2018 | Coli et al. |
| 2018/0363436 A1 | 12/2018 | Coli et al. |
| 2018/0363437 A1 | 12/2018 | Coli et al. |
| 2018/0363438 A1 | 12/2018 | Coli et al. |
| 2019/0003272 A1 | 1/2019 | Morris et al. |
| 2019/0003329 A1 | 1/2019 | Morris et al. |
| 2019/0010793 A1 | 1/2019 | Hinderliter |
| 2019/0011051 A1 | 1/2019 | Yeung |
| 2019/0063341 A1 | 2/2019 | Davis |
| 2019/0067991 A1 | 2/2019 | Davis et al. |
| 2019/0071992 A1 | 3/2019 | Feng |
| 2019/0072005 A1 | 3/2019 | Fisher et al. |
| 2019/0078471 A1 | 3/2019 | Braglia et al. |
| 2019/0091619 A1 | 3/2019 | Huang |
| 2019/0106316 A1 | 4/2019 | Van Vliet et al. |
| 2019/0106970 A1 | 4/2019 | Oehring |
| 2019/0112908 A1 | 4/2019 | Coli et al. |
| 2019/0112910 A1 | 4/2019 | Oehring et al. |
| 2019/0119096 A1 | 4/2019 | Haile et al. |
| 2019/0120024 A1 | 4/2019 | Oehring et al. |
| 2019/0120031 A1 | 4/2019 | Gilje |
| 2019/0120134 A1 | 4/2019 | Goleczka et al. |
| 2019/0128247 A1 | 5/2019 | Douglas, III |
| 2019/0128288 A1 | 5/2019 | Konada et al. |
| 2019/0131607 A1 | 5/2019 | Gillette |
| 2019/0136677 A1 | 5/2019 | Shampine et al. |
| 2019/0153843 A1 | 5/2019 | Headrick et al. |
| 2019/0154020 A1 | 5/2019 | Glass |
| 2019/0264667 A1 | 5/2019 | Byrne |
| 2019/0178234 A1 | 6/2019 | Beisel |
| 2019/0178235 A1 | 6/2019 | Coskrey et al. |
| 2019/0185312 A1 | 6/2019 | Bush et al. |
| 2019/0203572 A1 | 7/2019 | Morris et al. |
| 2019/0204021 A1 | 7/2019 | Morris et al. |
| 2019/0211814 A1 | 7/2019 | Weightman et al. |
| 2019/0217258 A1 | 7/2019 | Bishop |
| 2019/0226317 A1 | 7/2019 | Payne et al. |
| 2019/0245348 A1 | 8/2019 | Hinderliter et al. |
| 2019/0249652 A1 | 8/2019 | Stephenson et al. |
| 2019/0249754 A1 | 8/2019 | Oehring et al. |
| 2019/0257297 A1 | 8/2019 | Botting et al. |
| 2019/0277295 A1 | 9/2019 | Clyburn et al. |
| 2019/0309585 A1 | 10/2019 | Miller et al. |
| 2019/0316447 A1 | 10/2019 | Oehring et al. |
| 2019/0316456 A1 | 10/2019 | Beisel et al. |
| 2019/0323337 A1 | 10/2019 | Glass et al. |
| 2019/0330923 A1 | 10/2019 | Gable et al. |
| 2019/0331117 A1 | 10/2019 | Gable et al. |
| 2019/0338762 A1 | 11/2019 | Curry et al. |
| 2019/0345920 A1 | 11/2019 | Surjaatmadja et al. |
| 2019/0356199 A1 | 11/2019 | Morris et al. |
| 2019/0376449 A1 | 12/2019 | Carrell |
| 2020/0003205 A1 | 1/2020 | Stokkevåg et al. |
| 2020/0011165 A1 | 1/2020 | George et al. |
| 2020/0040878 A1 | 2/2020 | Morris |
| 2020/0049136 A1 | 2/2020 | Stephenson |
| 2020/0049153 A1 | 2/2020 | Headrick et al. |
| 2020/0071998 A1 | 3/2020 | Oehring et al. |
| 2020/0072201 A1 | 3/2020 | Marica |
| 2020/0088202 A1 | 3/2020 | Sigmar et al. |
| 2020/0095854 A1 | 3/2020 | Hinderliter |
| 2020/0132058 A1 | 4/2020 | Mollatt |
| 2020/0141219 A1 | 5/2020 | Oehring et al. |
| 2020/0141907 A1 | 5/2020 | Meek et al. |
| 2020/0166026 A1 | 5/2020 | Marica |
| 2020/0206704 A1 | 7/2020 | Chong |
| 2020/0224645 A1 | 7/2020 | Buckley |
| 2020/0256333 A1 | 8/2020 | Surjaatmadja |

(56) References Cited

U.S. PATENT DOCUMENTS

| | | |
|---|---|---|
| 2020/0263498 A1 | 8/2020 | Fischer et al. |
| 2020/0263525 A1 | 8/2020 | Reid |
| 2020/0263526 A1 | 8/2020 | Fischer et al. |
| 2020/0263527 A1 | 8/2020 | Fischer et al. |
| 2020/0263528 A1 | 8/2020 | Fischer et al. |
| 2020/0267888 A1 | 8/2020 | Putz |
| 2020/0291731 A1 | 9/2020 | Haiderer et al. |
| 2020/0309113 A1 | 10/2020 | Hunter et al. |
| 2020/0325752 A1 | 10/2020 | Clark et al. |
| 2020/0325760 A1 | 10/2020 | Markham |
| 2020/0325761 A1 | 10/2020 | Williams |
| 2020/0325893 A1 | 10/2020 | Kraige et al. |
| 2020/0332784 A1 | 10/2020 | Zhang et al. |
| 2020/0332788 A1 | 10/2020 | Cui et al. |
| 2020/0340313 A1 | 10/2020 | Fischer et al. |
| 2020/0340340 A1 | 10/2020 | Oehring et al. |
| 2020/0340344 A1 | 10/2020 | Reckels et al. |
| 2020/0340404 A1 | 10/2020 | Stockstill |
| 2020/0347725 A1 | 11/2020 | Morris et al. |
| 2020/0340322 A1 | 12/2020 | Sizemore et al. |
| 2020/0392826 A1 | 12/2020 | Cui et al. |
| 2020/0392827 A1 | 12/2020 | George et al. |
| 2020/0393088 A1 | 12/2020 | Sizemore et al. |
| 2020/0398238 A1 | 12/2020 | Zhong et al. |
| 2020/0400000 A1 | 12/2020 | Ghasripoor et al. |
| 2020/0400005 A1 | 12/2020 | Han et al. |
| 2020/0408071 A1 | 12/2020 | Li et al. |
| 2020/0408144 A1 | 12/2020 | Feng et al. |
| 2020/0408147 A1 | 12/2020 | Zhang et al. |
| 2021/0054727 A1 | 2/2021 | Floyd |
| 2021/0071574 A1 | 3/2021 | Feng et al. |
| 2021/0071579 A1 | 3/2021 | Li et al. |
| 2021/0071654 A1 | 3/2021 | Brunson |
| 2021/0071752 A1 | 3/2021 | Cui et al. |
| 2021/0087925 A1 | 3/2021 | Heidari et al. |
| 2021/0123425 A1 | 4/2021 | Cui et al. |
| 2021/0123434 A1 | 4/2021 | Cui et al. |
| 2021/0123435 A1 | 4/2021 | Cui et al. |
| 2021/0131409 A1 | 5/2021 | Cui et al. |
| 2021/0156240 A1 | 5/2021 | Cicci et al. |
| 2021/0156241 A1 | 5/2021 | Cook |
| 2021/0172282 A1 | 6/2021 | Wang et al. |
| 2021/0180517 A1 | 6/2021 | Zhou et al. |

FOREIGN PATENT DOCUMENTS

| | | |
|---|---|---|
| CN | 205260249 | 5/2016 |
| WO | 2015158020 | 10/2015 |
| WO | 2016033983 | 3/2016 |
| WO | 2016078181 | 5/2016 |
| WO | 2016101374 | 6/2016 |
| WO | 2016112590 | 7/2016 |
| WO | 2019200510 | 10/2019 |
| WO | 2019210417 | 11/2019 |
| WO | 2020018068 | 1/2020 |
| WO | 2020072076 | 4/2020 |
| WO | 2020097060 | 5/2020 |
| WO | 2020104088 | 5/2020 |
| WO | 2020131085 | 6/2020 |
| WO | 2020211083 | 10/2020 |
| WO | 2020211086 | 10/2020 |

OTHER PUBLICATIONS

Green Field Energy Services Natural Gas Driven Turbine Frac Pumps HHP Summit Presentation, Yumpu (Sep. 2012), https://www.yumpu.com/en/document/read/49685291/turbine-frac-pump-assembly-hhp ("Green Field").

Dowell B908 "Turbo-Jet" Operator's Manual.

Jereh Debut's Super power Turbine Fracturing Pump, Leading the Industrial Revolution, Jereh Oilfield Services Group (Mar. 19, 2014), https://www.prnewswire.com/news-releases/jereh-debuts-super-power-turbine-fracturing-pump-leading-the-industrial-revolution-250992111.html.

Jereh Apollo 4500 Turbine Frac Pumper Finishes Successful Field Operation in China, Jereh Group (Feb. 13, 2015), as available on Apr. 20, 2015, https://web.archive.org/web/20150420220625/https://www.prnewswire.com/news-releases/jereh-apollo-4500-turbine-frac-pumper-finishes-successful-field-operation-in-china-300035829.html.

35% Economy Increase, Dual-fuel System Highlighting Jereh Apollo Frac Pumper, Jereh Group (Apr. 13, 2015), https://www.jereh.com/en/news/press-release/news-detail-7345.htm.

Hydraulic Fracturing: Gas turbine proves successful in shale gasfield operations, Vericor (2017), https://www.vericor.com/wp-content/uploads/2020/02/7.-Fracing-4500hp-Pump-China-En.pdf ("Vericor Case Study").

Jereh Apollo Turbine Fracturing Pumper Featured on China Central Television, Jereh Group (Mar. 9, 2018), https://www.jereh.com/en/news/press-release/news-detail-7267.htm.

Jereh Unveiled New Electric Fracturing Solution at OTC 2019, Jereh Group (May 7, 2019), as available on May 28, 2019, https://web.archive.org/web/20190528183906/https://www.prnewswire.com/news-releases/jereh-unveiled-new-electric-fracturing-solution-at-otc-2019-300845028.html.

Jereh Group, Jereh Fracturing Unit, Fracturing Spread, YouTube (Mar. 30, 2015), https://www.youtube.com/watch?v=PlkDbU5dE0o.

Transcript of Jereh Group, Jereh Fracturing Unit, Fracturing Spread, YouTube (Mar. 30, 2015).

Jereh Group, Jereh Fracturing Equipment. YouTube (Jun. 8, 2015), https://www.youtube.com/watch?v=m0vMiq84P4Q.

Transcript of Jereh Group, Jereh Fracturing Equipment, YouTube (Jun. 8, 2015), https://www.youtube.com/watch?v=m0vMiq84P4Q.

Ferdinand P. Beer et al., Mechanics of Materials (6th ed. 2012).

Weir Oil & Gas Introduces Industry's First Continuous Duty 5000-Horsepower Pump, Weir Group (Jul. 25, 2019), https://www.global.weir/newsroom/news-articles/weir-oil-and-gas-introduces-industrys-first-continuous-duty-5000-horsepower-pump/.

2012 High Horsepower Summit Agenda, Natural Gas for High Horsepower Applications (Sep. 5, 2012).

Review of HHP Summit 2012, Gladstein, Neandross & Associates https://www.gladstein.org/gna-conferences/high-horsepower-summit-2012/.

Green Field Energy Services Deploys Third New Hydraulic Fracturing System, Green Field Energy Services, Inc. (Jul. 11, 2012), https://www.prnewswire.com/news-releases/green-field-energy-services-deploys-third-new-hydraulic-fracturing-spread-162113425.

Karen Boman, Turbine Technology Powers Green Field Multi-Fuel Frack Pump, Rigzone (Mar. 7, 2015), as available an Mar. 14, 2015, https://web.archive.org/web/20150314203227/https://www.rigzone.com/news/oil-gas/a/124883/Turbine_Technology_Powers_Green_Field_MultiFuel_Frack_Pump.

"Turbine Frac Units," WMD Squared (2012), https://wmdsquared.com/work/gfes-turbine-frac-units/.

Leslie Turj, Green Field asset sale called 'largest disposition industry has seen,' The INDsider Media (Mar. 19, 2014), http://theind.com/article-16497-green-field-asset-sale-called-%E2%80%98largest-disposition-industry-has-seen%60.html.

American Petroleum Institute. API 674: Positive Displacement Pumps—Reciprocating. 3rd ed. Washington, DC: API Publishing Services, 2010.

American Petroleum Institute. API 616: Gas Turbines for the Petroleum, Chemical, and Gas Industry Services. 5th ed. Washington, DC: API Publishing Services, 2011.

Karassik, Igor, Joseph Messina, Paul Cooper, and Charles Heald. Pump Handbook. 4th ed. New York: McGraw-Hill Education, 2008.

Weir SPM. Weir SPM General Catalog: Well Service Pumps, Flow Control Products, Manifold Trailers, Safety Products, Post Sale Services. Ft. Worth, TX: Weir Oil & Gas. May 28, 2016. https://www.pumpfundamentals.com/pumpdatabase2/weir-spm-general.pdf.

(56) References Cited

OTHER PUBLICATIONS

The Weir Group, Inc. Weir SPM Pump Product Catalog. Ft. Worth, TX: S.P.M. Flow Control, Inc. Oct. 30, 2017. https://manage.global.weir/assets/files/product%20brochures/SPM_2P140706_Pump_Product_Catalogue_View.pdf.
Shandong Saigao Group Corporation. Q4 (5W115) Quintuplex Plunger Pump. Jinan City, Shandong Province, China: Saigao. Oct. 20, 2014. https://www.saigaogroup.com/product/q400-5w115-quintuplex-plunger-pump.html.
Marine Turbine. Turbine Powered Frac Units. Franklin, Louisiana: Marine Turbine Technologies, 2020.
Rotating Right. Quintuplex Power Pump Model Q700. Edmonton, Alberta, Canada: Weatherford International Ltd. https://www.rotatingright.com/pdf/weatherford/RR%2026-Weatherford%20Model%20Q700.pdf, 2021.
CanDyne Pump Services, Inc. Weatherford Q700 Pump. Calgary, Alberta, Canada: CanDyne Pump Services. Aug. 15, 2015. http://candyne.com/wp-content/uploads/2014/10/10/181905-94921.q700-quintuplex-pump.pdf.
Arop, Julius Bankong. Geomechanical review of hydraulic fracturing technology. Thesis (M. Eng.). Cambridge, MA: Massachusetts Institute of Technology, Dept. of Civil and Environmental Engineering. Oct. 29, 2013. https://dspace.mit.edu/handle/1721.1/82176.
AFGlobal Corporation, Durastim Hydraulic Fracturing Pump, A Revolutionary Design for Continuous Duty Hydraulic Fracturing, 2018.
ResearchGate, Answer by Byron Woolridge, found at https://www.researchgate.net/post/How_can_we_improve_the_efficiency_of_the_gas_turbine_cycles, Jan. 1, 2013.
Filipović, Ivan, Preliminary Selection of Basic Parameters of Different Torsional Vibration Dampers Intended for use in Medium-Speed Diesel Engines, Transactions of Famena XXXVI-3 (2012).
Marine Turbine Technologies, 1 MW Power Generation Package, http://marineturbine.com/power-generation, 2017.
Business Week: Fiber-optic cables help fracking, cablinginstall.com. Jul. 12, 2013. https://www.cablinginstall.com/cable/article/16474208/businessweek-fiberoptic-cables-help-fracking.
Fracking companies switch to electric motors to power pumps, iadd-intl.org. Jun. 27, 2019. https://www.iadd-intl.org/articles/fracking-companies-switch-to-electric-motors-to-power-pumps/.
The Leader in Frac Fueling, suncoastresources.com. Jun. 29, 2015. https://web.archive.org/web/20150629220609/https://www.suncoastresources.com/oilfield/fueling-services/.
Mobile Fuel Delivery, atlasoil.com. Mar. 6, 2019. https://www.atlasoil.com/nationwide-fueling/onsite-and-mobile-fueling.
Frac Tank Hose (FRAC), 4starhose.com. Accessed: Nov. 10, 2019. http://www.4starhose.com/product/frac_tank_hose_frac.aspx.
PLOS ONE, Dynamic Behavior of Reciprocating Plunger Pump Discharge Valve Based on Fluid Structure Interaction and Experimental Analysis. Oct. 21, 2015.
FMC Technologies, Operation and Maintenance Manual, L06 Through L16 Triplex Pumps Doc No. OMM50000903 Rev: E p. 1 of 66. Aug. 27, 2009.
Gardner Denver Hydraulic Fracturing Pumps GD 3000 https://www.gardnerdenver.com/en-us/pumps/triplex-fracking-pump-gd-3000.
Lekontsev, Yu M., et al. "Two-side sealer operation." Journal of Mining Science 49.5 (2013): 757-762.
Tom Hausfeld, GE Power & Water, and Eldon Schelske, Evolution Well Services, TM2500+ Power for Hydraulic Fracturing.
FTS International's Dual Fuel Hydraulic Fracturing Equipment Increases Operational Efficiencies, Provides Cost Benefits, Jan. 3, 2018.
CNG Delivery, Fracturing with natural gas, dual-fuel drilling with CNG, Aug. 22, 2019.
PbNg, Natural Gas Fuel for Drilling and Hydraulic Fracturing, Diesel Displacement / Dual Fuel & Bi-Fuel, May 2014.
integrated Flow, Skid-mounted Modular Process Systems, Jul. 15, 2017, https://ifsolutions.com/why-modular/.
Cameron, A Schlumberger Company, Frac Manifold Systems, 2016.

ZSi-Foster, Energy | Solar | Fracking | Oil and Gas, Aug. 2020, https://www.zsi-foster.com/energy-solar-fracking-oil-and-gas.html.
JBG Enterprises, Inc., WS-Series Blowout Prevention Safety Coupling—Quick Release Couplings, Sep. 11, 2015, http://www.jgbhose.com/products/WS-Series-Blowout-Prevention-Safety-Coupling.asp.
Halliburton, Vessel-based Modular Solution (VMS), 2015.
Chun, M. K., H. K. Song, and R. Lallemand. "Heavy duty gas turbines in petrochemical plants: Samsung's Daesan plant (Korea) beats fuel flexibility records with over 95% hydrogen in process gas." Proceedings of PowerGen Asia Conference, Singapore. 1999.
Wolf, Jurgen J., and Marko A. Perkavec. "Safety Aspects and Environmental Considerations for a 10 MW Cogeneration Heavy Duty Gas Turbine Burning Coke Oven Gas with 60% Hydrogen Content." ASME 1992 International Gas Turbine and Aeroengine Congress and Exposition. American Society of Mechanical Engineers Digital Collection, 1992.
Ginter, Timothy, and Thomas Bouvay. "Uprate options for the MS7001 heavy duty gas turbine." GE paper GER-3808C, GE Energy 12 (2006).
Chaichan, Miqdam Tariq. "The impact of equivalence ratio on performance and emissions of a hydrogen-diesel dual fuel engine with cooled exhaust gas recirculation." International Journal of Scientific & Engineering Research 6.6 (2015): 938-941.
Ecob, David J., et al. "Design and Development of a Landfill Gas Combustion System for the Typhoon Gas Turbine." ASME 1996 International Gas Turbine and Aeroengine Congress and Exhibition. American Society of Mechanical Engineers Digital Collection, 1996.
II-VI Marlow Industries, Thermoelectric Technologies in Oil, Gas, and Mining Industries, blog.marlow.com (Jul. 24, 2019).
B.M. Mahlalela, et al., Electric Power Generation Potential Based on Waste Heat and Geothermal Resources in South Africa, pangea.stanford.edu (Feb. 11, 2019).
Department of Energy, United States of America, The Water-Energy Nexus: Challenges and Opportunities purenergypolicy.org (Jun. 2014).
Ankit Tiwari, Design of a Cooling System for a Hydraulic Fracturing Equipment, The Pennsylvania State University, The Graduate School, College of Engineering, 2015.
Jp Yadav et al.. Power Enhancement of Gas Turbine Plant by Intake Air Fog Cooling, Jun. 2015.
Mee Industries: Inlet Air Fogging Systems for Oil, Gas and Petrochemical Processing, Verdict Media Limited Copyright 2020.
M. Ahmadzadehtalatapeh et al.Performance enhancement of gas turbine units by retrofitting with inlet air cooling technologies (IACTs): an hour-by-hour simulation study, Journal of the Brazilian Society of Mechanical Sciences and Engineering, Mar. 2020.
Advances in Popular Torque-Link Solution Offer OEMs Greater Benefit, Jun. 21, 2018.
Emmanuel Akita et al., Mewbourne College of Earth & Energy, Society of Petroleum Engineers; Drilling Systems Automation Technical Section (DSATS); 2019.
PowerShelter Kit II, nooutage.com, Sep. 6, 2019.
EMPengineering.com, HEMP Resistant Electrical Generators / Hardened Structures HEMP/GMD Shielded Generators, Virginia, Nov. 3, 2012.
Blago Minovski, Coupled Simulations of Cooling and Engine Systems for Unsteady Analysis of the Benefits of Thermal Engine Encapsulation, Department of Applied Mechanics, Chalmers University of Technology Göteborg, Sweden 2015.
J. Porteiro et al., Feasibility of a new domestic CHP trigeneration with heat pump: II. Availability analysis. Design and development. Applied Thermal Engineering 24 (2004) 1421-1429.
Europump and Hydrualic Institute, Variable Speed Pumping: A Guide to Successful Applications, Elsevier Ltd, 2004.
Capstone Turbine Corporation, Capstone Receives Three Megawatt Order from Large Independent Oil & Gas Company in Eagle Ford Shale Play, Dec. 7, 2010.
Wikipedia, Westinghouse Combustion Turbine Systems Division, https://en.wikipedia.org/wiki/Westinghouse_Combustion_Turbine_Systems_Division, circa 1960.
Wikipedia,Union Pacific GTELs, https://en.wikipedia.org/wiki/Union_Pacific_GTELs, circa 1950.

(56) References Cited

OTHER PUBLICATIONS

HCI JET Frac, Screenshots from YouTube, Dec. 11, 2010. https://www.youtube.com/watch?v=6HjXkdbFaFQ.

AFD Petroleum Ltd., Automated Hot Zone, Frac Refueling System, Dec. 2018.

Eygun, Christiane, et al., URTeC: 2687987, Mitigating Shale Gas Developments Carbon Footprint: Evaluating and Implementing Solutions in Argentina, Copyright 2017, Unconventional Resources Technology Conference.

Walzel, Brian, Hart Energy, Oil, Gas Industry Discovers Innovative Solutions to Environmental Concerns, Dec. 10, 2018.

Frac Shack, Bi-Fuel FracFueller brochure, 2011.

Pettigrew, Dana, et al., High Pressure Multi-Stage Centrifugal Pump for 10,000 psi Frac Pump—HPHPS Frac Pump, Copyright 2013, Society of Petroleum Engineers, SPE 166191.

Elle Seybold, et al., Evolution of Dual Fuel Pressure Pumping for Fracturing: Methods, Economics, Field Trial Results and Improvements in Availability of Fuel, Copyright 2013, Society of Petroleum Engineers, SPE 166443.

Wallace, E.M., Associated Shale Gas: From Flares to Rig Power, Copyright 2015, Society of Petroleum Engineers, SPE-173491-MS.

Williams, C.W. (Gulf Oil Corp. Odessa Texas), The Use of Gas-turbine Engines in an Automated High-Pressure Water-injection Stations; American Petroleum Institute; API-63 144 (Jan. 1, 1963).

Neal, J.C. (Gulf Oil Corp. Odessa Texas), Gas Turbine Driven Centrifugal Pumps for High Pressure Water Injection; American Institute of Mining, Metallurgical and Petroleum Engineers, Inc.; SPE-1888 (1967).

Porter, John A. (SOLAR Division International Harvester Co.), Modern Industrial Gas Turbines for the Oil Field; American Petroleum Institute; Drilling and Production Practice; API-67-243 (Jan. 1, 1967).

Cooper et al., Jet Frac Porta-Skid—A New Concept in Oil Field Service Pump Equipments[sic]; Halliburton Services SPE-2706 (1969).

Ibragimov, É.S., Use of gas-turbine engines in oil field pumping units; Chem Petrol Eng; (1994) 30: 530. https://doi.org/10.1007/BF01154919. (Translated from Khimicheskaya i Neftyanoe Mashinostroenie, No. 11, pp. 24-26, Nov. 1994.).

Kas'yanov et al., Application of gas-turbine engines in pumping units complexes of hydraulic fracturing of oil and gas reservoirs; Exposition Oil & Gas; (Oct. 2012) (published in Russian).

\* cited by examiner

| BLENDER PUMPS kW DRAW AT 125 BPM | SUCTION PUMP | DISCHARGE PUMP | CHEMICAL PUMP X3 |
|---|---|---|---|
| FLOW RATE (GPM) | 5250 | 5250 | 12 |
| OPERATION RPM | 1250 | 1550 | 600 |
| PUMP EFFICIENCY | 0.8 | 0.5 | 0.9 |
| OUTPUT PRESSURE | 30 | 130 | 150 |
| HORSEPOWER DRAW | 114.84 | 796.25 | 1.17 |
| kW DRAW | 85.56 | 593.21 | 0.87 |
| DRIVING MOTOR EFFICIENCY | 0.80 | 0.80 | 0.80 |
| TOTAL kW DRAW | 106.95 | 741.51 | 1.09 |

FIG. 2

DRIVE EQUIPMENT AND METHODS FOR MOBILE FRACTURING TRANSPORTATION PLATFORMS

PRIORITY CLAIM

This is a divisional of U.S. Non-Provisional application Ser. No. 17/301,305, filed Mar. 31, 2021, titled "DRIVE EQUIPMENT AND METHODS FOR MOBILE FRACTURING TRANSPORTATION PLATFORMS," which claims priority to and the benefit of, under 35 U.S.C. § 119(e), U.S. Provisional Application No. 62/705,055, filed Jun. 9, 2020, titled "DRIVE EQUIPMENT AND METHODS FOR MOBILE FRACTURING TRANSPORTATION PLATFORMS," the disclosures of which are incorporated herein by reference in their entireties.

TECHNICAL FIELD

The application generally relates to mobile power units and, more specifically, drive equipment and methods for usage and installation on mobile fracturing transportation platforms.

BACKGROUND

Conventional hydraulic fracturing horsepower units often utilize diesel reciprocating engines to drive positive displacement reciprocating pumps. These pumps generally form a part of a fracturing fluid system which often includes auxiliary equipment such as blenders, hydration, and chemical pumps. This auxiliary equipment is commonly referred to as backside equipment and may be powered by diesel reciprocating deck engines or small mobile diesel generators.

The fracturing industry has been making strides to reduce emissions and footprint. Specifically, the fracturing industry has been making strides to reach government mandated tier 4 emissions standards, namely a government mandated reduction in harmful exhaust gases for diesel powered equipment. One way the fracturing industry is moving towards tier 4 emissions is to replace the diesel reciprocating engines with turbine engines that are fueled with natural gas to directly drive hydraulic fracturing pumps. This allows fracturing horsepower units to reach tier 4 emission standards. The backside equipment, however, remains driven by engines or generators that struggle with meeting or otherwise do not meet tier 4 emission standards.

In addition, often it is necessary to run multiple diesel engines to power backside equipment, and running multiple diesel engines to power backside equipment may increase costs both through fuel consumption and maintenance. The reciprocating engines on the auxiliary equipment, specifically blenders and hydration units, may include a transmission and gearbox inline to power a pump. These added parts may add another mode of failure and further increase maintenance spending.

One method that has been used for achieving tier 4 emissions standards for the backside equipment is to convert the backside equipment to an electrical fracturing fleet. These electrical fracturing fleets generally use a standalone gas turbine engine generator trailer, or other transportation platform as understood by those skilled in the art, to produce electrical power that is distributed through electrical switch gear to drive electrical motors directly coupled to the horsepower units. These electrical motors may be controlled with a high efficiency, high power factor active front end drive (AFE) or variable frequency drive. The standalone gas turbine engine generator trailer also may be rigged into the backside equipment to power the backside equipment. Although this arrangement may meet tier 4 emission standards under some conditions, an electrical fracturing fleet requires a dedicated generator unit. A dedicated generator unit requires additional cost to develop, build, and maintain.

Applicant has recognized that using an electrical fracturing fleet with a dedicated turbine generator may not always be feasible or economical. For example, electrical generators are commonly mounted on skids which may restrict mobility and requires extensive rig up procedures. In addition, power transfer may not always be efficient depending on cable lengths and motor efficiencies. Further, weather conditions also play a factor as the fracturing service may be supplied in a wide range of weather conditions which may affect service. For example, high temperature conditions may require different cooling packages since generators start losing efficiency at higher temperatures. During high temperature conditions resistance in generators decreases causing lower efficiencies, if this effect is too high, running an electrical generator may no longer be economical. As such it is not always beneficial to have a dedicated generator.

SUMMARY

In today's oil and gas service environment, flexibility and adaptability may be important. Applicant also has recognized that due to the nature of hydraulic fracturing, more horsepower than what is readily available is often required. Having a mobile power unit that may drive a hydraulic fracturing pump or an electric power generator may be beneficial in terms of flexibility. Accordingly, Applicant further has recognized that being able to quickly configure a mobile power unit driving a turbine generator into a mobile power unit driving a reciprocating pump may allow fracturing equipment to meet these changing horsepower demands and effectuate tier 4 emission standards. In other cases, due to site footprints, providing horsepower is the priority for all available space. As such, having a dedicated generator may not be the best solution for power generation.

Applicant still further has recognized that another drawback of a dedicated generator is the upfront engineering and cost to produce the unit. The generators may require extensive engineering hours along with different components and parts. The benefit of having a turbine driven fracturing pump that may be configured into an electrical generator provides flexibility and adaptability and may save costs by utilizing similar parts and components.

According to embodiments of systems and methods of the disclosure, for systems that include a natural gas turbine generator, the backside equipment such as the diesel deck engines, gearboxes, and transmissions may be removed, and instead, backside equipment, such as centrifugal or other types of pumps, may be powered with higher reliability electric pumps. One of the most common modes of failure with this backside equipment is hydraulic leaks or failures. With an electric motor, the need for hydraulic circuits to power the backside equipment may be removed. Thus, converting the backside equipment to be driven by electrical motors may also increase reliability of the backside equipment and, thus, increase uptime or reduce maintenance costs. Also, having electric motors connected to or coupled to pumps, as opposed to hydraulic motors, may yield more efficiency in an electric fleet arrangement, and this, in turn, may result in an improvement in running costs and a reduction in heat rejection which removes need, in some instances, for high air to oil cooler systems, as will be understood by those skilled in the art.

According to embodiments of systems and methods, it also is anticipated that the natural gas turbine fleets may be converted to be completely electric. With enough turbine generator units and a power distribution system, the natural gas turbine fleets may remove the tier 4 diesel deck engines on the fracturing pumps that often are used to start the turbines and run the on-board auxiliary equipment. This may reduce costs as tier 4 diesel deck engines may be expensive.

Further, this application is directed to embodiments of high pressure pumps and power generators that readily are installable on mobile fracturing transportation platforms, such as trailers, and that may include a dual fuel, dual shaft turbine engine mounted to the mobile fracturing trailer selectively to drive either the high pressure pumps or the power generators when installed on the mobile fracturing trailer.

According to one embodiment of the disclosure, a mobile power unit includes a gas turbine engine, a drive shaft, a reduction gearbox, and a transportation platform. The gas turbine engine includes an engine output shaft that rotates to provide energy from the gas turbine engine. The reduction gearbox is disposed between the engine output shaft and the drive shaft such that the speed of rotation of the engine output shaft to a speed of rotation of the drive shaft is reduced. The reduction gearbox may have a ratio in a range of 5:1 to 20:1. The transportation platform includes a drive equipment receiver that is configured to receive drive equipment therein such that the drive equipment is positioned to be connected to the drive shaft. The gas turbine engine is mounted to the transportation platform so that the reduction gearbox and the drive shaft are attached to the transportation platform. The transportation platform having a first configuration when a pump is installed in the drive equipment receiver such that the pump is driven by the gas turbine engine. The pump connected to the drive shaft when the pump is installed in the drive equipment receiver such that the pump is configured to provide high pressure fluid when driven by the gas turbine engine. The transportation platform having a second configuration when an electrical generator is installed in the drive equipment receiver such that the electrical generator is driven by the gas turbine engine. The electrical generator being connected to the drive shaft and configured to provide electrical power when driven by the gas turbine engine.

In embodiments, the reduction gearbox may have a ratio of 11:1. The electrical generator may include a generator gearbox that is configured to step up a speed of rotation of the drive shaft. The generator gearbox may have a ratio in a range of 1:1.25 to 1:5.

In another embodiment of the disclosure, a mobile power unit includes a gas turbine engine, a drive shaft, a fixed reduction gearbox, and an electrical generator. The gas turbine engine includes an engine output shaft. The drive shaft is driven by the gas turbine engine and is configured to connect to a hydraulic fracturing pump so that the pump provides high pressure fluid for hydraulic fracturing. The fixed reduction gearbox is positioned between the gas turbine engine and the drive shaft. The reduction gear box reducing a speed of rotation of the engine output shaft of the gas turbine engine to a speed for rotation of the drive shaft. The electrical generator is connected to the drive shaft and includes a step up generator gearbox and an alternator. The alternator being configured to generate electrical power.

In embodiment, the fixed reduction gearbox may have a ratio in a range of 5:1 to 20:1, e.g., 11:1. The fixed reduction gearbox may reduce a maximum speed of the drive shaft to 1500 RPM. The alternator may be a permanent magnet alternator having 2 or 4 poles.

In yet another embodiment of the disclosure, a well pad includes a plurality of mobile power units, and a blender unit, a hydration unit, or a chemical additive unit. Each mobile power unit of the plurality of mobile power units includes a gas turbine engine, a drive shaft, a reduction gearbox, and a transportation platform. The gas turbine engine includes an engine output shaft that rotates to provide energy from the gas turbine engine. The reduction gearbox is disposed between the engine output shaft and the drive shaft such that the speed of rotation of the engine output shaft is reduced to a speed of the drive shaft. The reduction gearbox may have a ratio in a range of 5:1 to 20:1. The transportation platform may include a drive equipment receiver defined thereon. The gas turbine engine mounted to the transportation platform such that the reduction gearbox and the drive shaft are secured to the transportation platform. The well pad includes a first mobile power unit that includes an electrical generator installed in the drive equipment receiver of the transportation platform such that the electrical generator is driven by the gas turbine engine of the first mobile power unit. The well pad includes a second mobile power unit that includes a hydraulic fracturing pump installed in the drive equipment receiver of the transportation platform such that the hydraulic fracturing pump is driven by the gas turbine engine of the second mobile power unit. The blender unit, hydration unit, or chemical additive unit includes a first pump that includes an electric motor to rotate the first pump. The first pump receiving electrical power from the electrical generator of the first mobile power unit.

In yet another embodiment of the disclosure, a method of changing drive equipment of a mobile power unit includes operating a first mobile power unit in a first configuration, operating the first mobile power unit in a second configuration, and interchanging the first mobile power unit between the first configuration and the second configuration. Operating the first mobile power unit in the first configuration includes a gas turbine engine of the first mobile power unit driving a pump to provide high pressure fluid. The pump connected to a drive shaft that has a maximum speed of rotation in a range of 1000 RPM to 1700 RPM. Operating the first mobile power unit in the second configuration includes the gas turbine engine driving an electrical generator to provide electrical power with the electrical generator connected to the drive shaft. Interchanging the first mobile power unit between the first and second configurations includes changing the pump or the electrical generator for the other of the pump and the electrical generator.

In embodiments, operating the first mobile power unit in the second configuration includes providing electrical power to a blender unit, a hydration unit, or a chemical additive unit of a well pad or providing electrical energy to auxiliary equipment of the second mobile power unit.

In some embodiments, interchanging the first mobile power unit between the first configuration and the second configuration may include disconnecting the pump form an output flange of the drive shaft, lifting a first skid including the pump from a drive equipment receiver of a transportation platform of the first mobile power unit, installing a second skid including the electrical generator into the drive equipment receiver, and connecting the electrical generator to the output flange of the drive shaft. The first skid may be lifted with a crane or a forklift and may occur at a well pad.

In yet another embodiment of the present disclosure, a method of controlling a well pad includes controlling a first mobile power unit, a second mobile power unit, and a blender unit, a hydration unit, or a chemical additive unit with a supervisory control unit. The first mobile power unit includes a gas turbine engine driving an electrical generator. The second mobile power unit includes a gas turbine engine driving a hydraulic fracturing pump. The blender unit, hydration unit, or chemical additive unit receives electrical power from the first mobile power unit.

To the extent consistent, any of the embodiments or aspects described herein may be used in conjunction with any or all of the other embodiments or aspects described herein.

BRIEF DESCRIPTION OF THE DRAWINGS

The accompanying drawings, which are included to provide a further understanding of the embodiments of the present disclosure, are incorporated in and constitute a part of this specification, and together with the detailed description, serve to explain the principles of the embodiments discussed herein. The present disclosure may be more readily described with reference to the accompanying drawings.

FIG. 2 is a table illustrating exemplary power consumption of pumps of a blender unit according to an embodiment of the disclosure.

DETAILED DESCRIPTION

Figure 1:
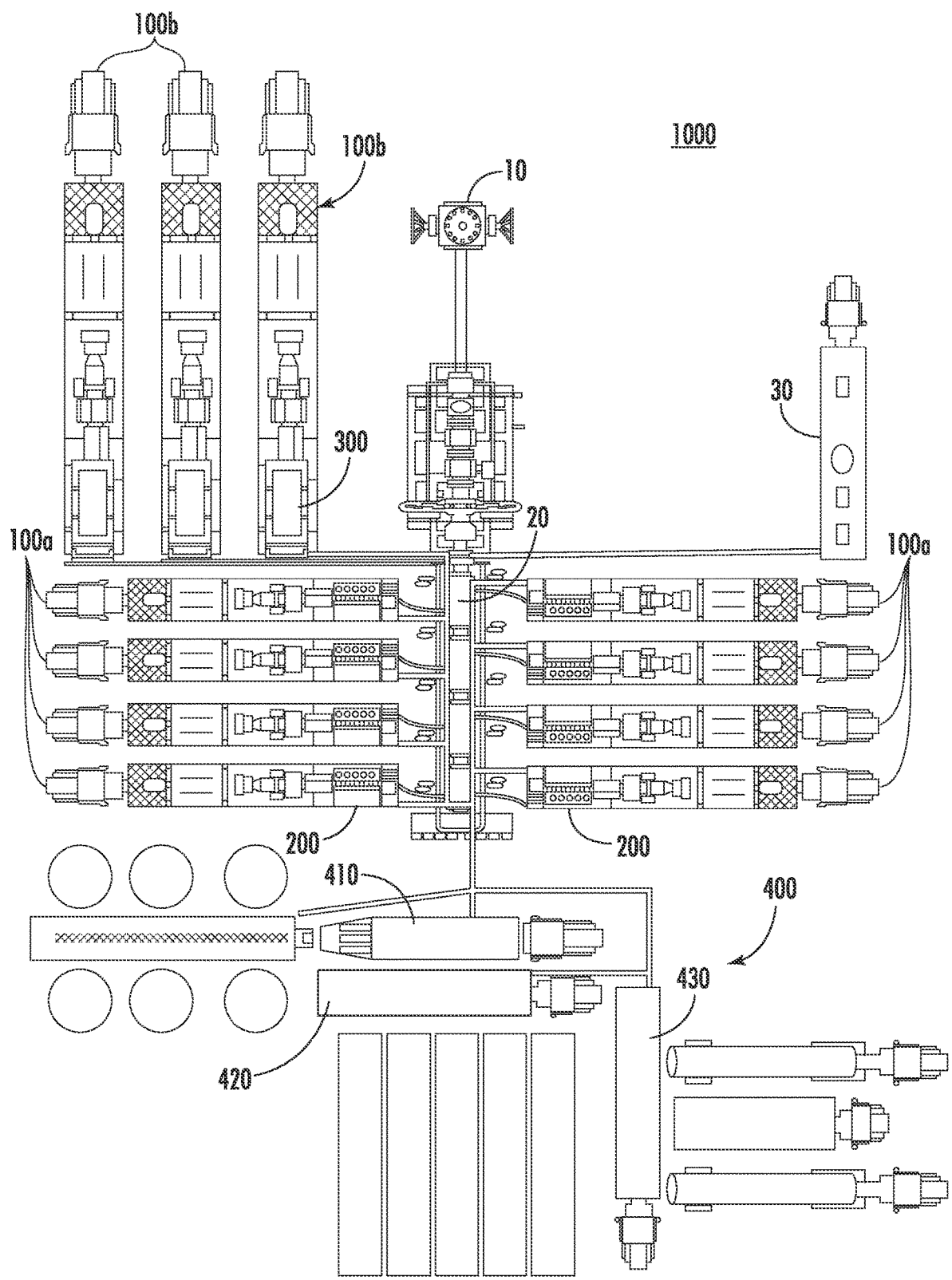
FIG. 1 is a schematic view of a well pad layout according to an embodiment of the disclosure.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect may be combined with features from any other embodiment or aspect in any appropriate combination. For example, any individual or collective features of method aspects or embodiments may be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

Embodiments of the present disclosure are directed to mobile power units and associated methods that may include interchangeable drive equipment. Specifically, mobile power units may include an engine that is coupled to drive equipment such that the drive equipment is driven by the engine. The drive equipment may be a hydraulic fracturing pump or an electrical generator that is interchangeable in the field to allow for a quick changeover between providing high pressure fluid with the fracturing pump and providing electrical power with the electrical generator or vice versa depending on the demands of the well pad.

FIG. 1 illustrates an exemplary well pad layout 1000 that is provided in accordance with an embodiment of the present disclosure. The well pad layout 1000 includes a plurality of mobile power units 100 arranged around a wellhead 10 to supply the wellhead 10 with high-pressure fracturing fluids and recover oil and/or gas from the wellhead 10 as will be understood by those skilled in the art. As shown, some of the mobile power units 100, e.g., mobile power units 100*a*, drive a hydraulic fracturing pump 200 that provides high pressure fluid to a manifold 20 such that the high pressure fluid is provided to the wellhead 10.

Additionally, some of the mobile power units 100, e.g., mobile power units 100*b*, drive an electrical generator 300 that provides electrical power to the well pad layout 1000. For example, the well pad layout 1000 may include auxiliary or backside equipment 400, as will be understood by those skilled in the art, that requires electrical power to provide fluids to the manifold 20 or the wellhead 10. Specifically, the backside equipment 400 of the well pad layout 100, for example, may include a blender unit 410, a hydration unit 420, or a chemical additive unit 430. Each of the units 410, 420, 430 may be supplied electrical power or electrified such that pumps and other equipment of the units 410, 420, 430 run on the electrical power. Traditionally, blender units, hydration units, and chemical additive units require horsepower provided by diesel deck engines or small diesel generators. The diesel deck engines and generators may include gearboxes, transmissions, and hydraulic circuits that each require maintenance and may cause failures or breakdowns of the respective unit 410, 420, 430. Electrifying the units 410, 420, 430 by replacing the diesel deck engines, gearboxes, transmissions, and hydraulic circuits with electrical motors may increase in-service time, reduce running costs, decrease maintenance, and decrease emissions of the units 410, 420, 430. In addition, electrifying the units 410, 420, 430 may allow the units 410, 420, 430 of the auxiliary or backside equipment to meet tier 4 emissions standards.

As also shown in FIG. 2, in an embodiment, the electrical power requirements of the units 410, 420, 430 may be calculated for a wellhead, e.g., wellhead 10, having a maximum anticipated flow rate of 125 barrels per minute (BPM). For example, if pumps of a blender unit 410 are to be electrified, the electrical power demands of the pumps of the blender unit 410 may be calculated based on a maximum anticipated flow rate of the well pad or the fracturing site. Given the maximum anticipated flow rate of 125 BPM, the table of FIG. 2 illustrates exemplary calculations of the power demands of pumps of the blender unit 410. As shown, the blender unit 410 may include a suction pump 412, a discharge pump 414, and multiple chemical pumps 416. The chemical pumps 416 may be included on the blender unit 410 or the chemical additive unit 430. The maximum flow rate of 125 BPM converts to a maximum flow rate of 5250 gallons per minute (GPM) through the blender unit 410. With such a flow rate, a suction pump 412 of the blender unit 410 may operate at 1250 revolutions per minute (RPM) with an output pressure of 30 pounds per square inch (psi) such that with an eighty percent efficiency of the suction pump 412, the suction pump 412 may be sized as a 115 horsepower electrical pump. Such a 115 horsepower pump, for example, may have an electrical draw of 86 kilowatts (kW) as will be understood by those skilled in the art. Given a motor efficiency of eighty percent, however, an electrical driving motor for the suction pump 412 may have an electrical draw of 110 kW. Repeating this calculation for the discharge pump 414 results in an electrical draw of 750 kW for the motor driving the discharge pump 414. Similarly, the chemical pumps 416 may have an electrical draw of 1 kW. In addition, the blender unit 410 also may include other auxiliary components that require electrical power including, but not limited to, sand augers, air compressors, and PLC controllers. The power requirements for these auxiliary components of the blender unit 410 may require 250 kW of electrical power. Thus, the total electrical power to run the blender unit 410 at the maximum flow rate of 125 BPM is 1,100 kW. This process may be repeated for a hydration unit 420 which may have an electrical power requirement of 690 kW. Thus, for example, the total electrical requirement to run the units 410, 420, 430 may be 1,790 kW as will be understood by those skilled in the art. A single mobile power unit 100 including an engine 120 producing 5100 horsepower may be converted by an electrical generator 300 to produce 3,800 kW of electrical power which would be more than sufficient to provide electrical power for the units 410, 420, 430 of the auxiliary equipment.

In some embodiments, it also may be desirable to electrify the auxiliary equipment of the mobile power units 100, e.g., mobile power units 100*a*. The auxiliary equipment of the mobile power units 100*a*, for example, may include, but not be limited to, fuel pumps, cooling pumps, oil/lubrication pumps, cooling fans, and controllers as understood by those skilled in the art. The electrical power requirements for the auxiliary equipment of the mobile power unit may be 270 kW. As a well pad layout, e.g., well pad layout 1000, may include eight mobile power units 100*a* driving pumps, and the total electrical power requirement for electrifying the auxiliary equipment of the mobile power unit 100 of the well pad layout 1000 collectively may be 2,160 kW.

If it is desired to electrify the units 410, 420, 430 and the auxiliary equipment of the mobile power units 100*b*, the total electrical power requirement of the well pad layout 1000 may be the sum of the 1,790 kW for the units 410, 420, 430 and the 2,160 kW for electrifying the auxiliary equipment of eight mobile power units 100*a* such that the total electrical power requirement for the well pad layout 1000 may be 3,950 kW. This electrical power requirement may be beyond the capability of a single mobile power unit 100*b* driving an electrical generator 300. As such, were the auxiliary equipment of the mobile power units 100*a* also electrified, at least two mobile power units 100*b* driving electrical generators 300 would be required. Additionally, a third mobile power unit 100*b* driving an electrical generator 300 may be desired for redundancy sake. The third mobile power unit 100*b* driving an electrical generator 300 may allow for maintenance and downtime on one of the mobile power units 100*b* driving electrical generators 300 or be available as an extra mobile power unit 100*a* as the drive equipment, e.g., the pump 200 or electrical generator 300, is and field changeable as detailed below.

The well pad layout 1000 may include a supervisory control unit 30 that monitors and controls operation of the mobile power units 100*a* driving fracturing pumps 200, the mobile power units 100*b* driving electrical generators 300, and the units 410, 420, 430. The supervisory control unit 30 may be a mobile control unit in the form of a trailer or a van, as appreciated by those skilled in the art. In some embodiments, the supervisory control unit 30 receives electrical power from the mobile power units 100*b*.

Figure 3:
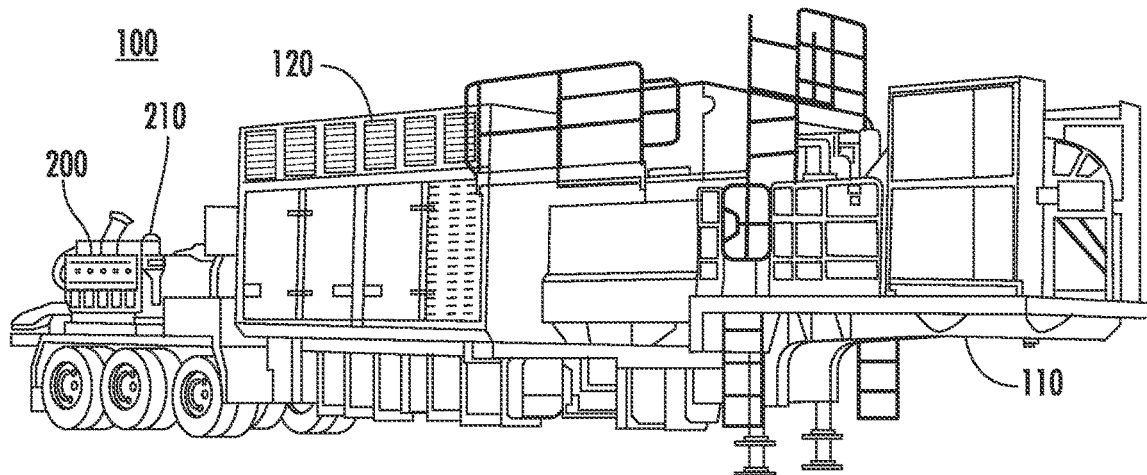
FIG. 3 is a perspective view of a mobile power unit according to an embodiment of the disclosure.

FIG. 3 illustrates an exemplary mobile power unit 100 that is provided in accordance with an embodiment of the present disclosure. As noted above, the mobile power units 100 detailed herein include a gas turbine engine 120 that provides mechanical horsepower to drive equipment in the form of a hydraulic fracturing pump 200 or an electrical generator 300. As described in greater detail below, the hydraulic fracturing pump 200 and the electrical generator 300 are designed as modular components that may be removed and replaced with another pump 200 or generator 300 without modifying the remainder of the mobile power unit 100. Such a modular design may allow for a single mobile power unit 100 to drive a pump 200 and then be changed over to drive an electrical generator 300, or vice versa, depending on the demands of the well pad.

The exemplary mobile power unit 100*a* of FIG. 3 includes transportation platform 110, an engine 120, and a hydraulic fracturing pump 200. The transportation platform 110 is shown as a single trailer with the entire mobile power unit 100 and components thereof mounted or installed thereto. For example, it may be advantageous to have the entire mobile power unit 100 mounted to a single trailer such that setup and startup of the mobile power unit 100 does not require onsite assembly of the mobile power unit 100. In addition, mounting the entire mobile power unit 100 to a single trailer may decrease a footprint of the mobile power unit 100. The transportation platform 110 may be a trailer that may be pulled by a tractor (not shown) on and off public highways as will be understood by those skilled in the art. In some embodiments, the transportation platform may include more than one trailer.

The engine 120 is mounted to the transportation platform 110 and may be any suitable engine including, but not limited to, an internal combustion engine or a gas turbine engine. The engine 120 may be a dual fuel engine operating on gasoline, natural gas, well gas, field gas, diesel, and/or other suitable fuel. In some embodiments, the engine 120 may be a dual fuel engine operating on a liquid fuel and a gaseous fuel. In certain embodiments, the engine 120 is a dual fuel gas turbine engine that asynchronously operates on diesel fuel, e.g., #2 diesel as will be understood by those skilled in the art, and on a gaseous fuel, e.g., natural gas, well gas, or field gas. In particular embodiments, the engine 120 is a dual fuel, dual shaft gas turbine engine that operates on a liquid fuel such as diesel fuel and a gaseous fuel such as natural gas, well gas, or field gas.

Figure 4:
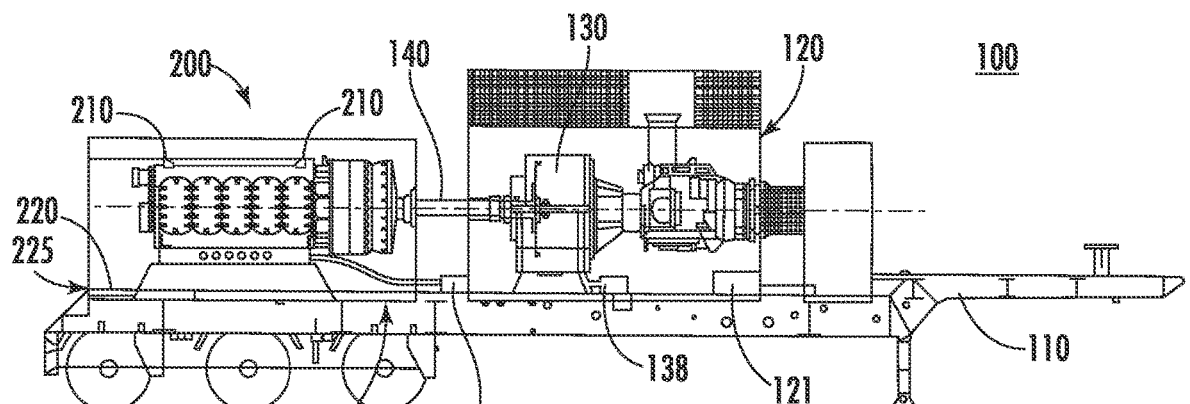
FIG. 4 is a schematic view of the mobile power unit of FIG. 3 driving a fracturing pump according to an embodiment of the disclosure.
Figure 5:
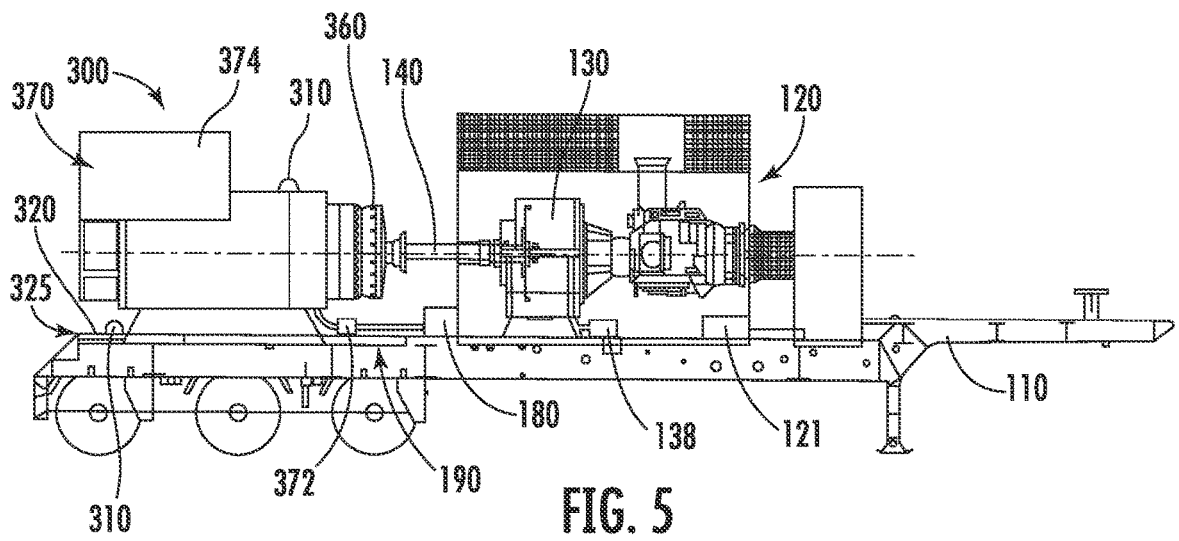
FIG. 5 is a schematic view of the mobile power unit of FIG. 3 driving a generator according to an embodiment of the disclosure.

FIGS. 4 and 5 illustrate that an embodiment of a mobile power unit 100 that selectively may be provided with either a fracturing pump 200 (FIG. 4) or an electrical generator 300 (FIG. 5) that is driven by the engine 120. The pump 200 and the electrical generator 300 may be referred to generally as the "drive equipment." The mobile power unit 100 includes a drive equipment position or receiver 190 that receives and secures the drive equipment to the mobile power unit 100 such that the drive equipment is driven by the engine 120 of the mobile power unit 100. The mobile power unit 100 may include auxiliary equipment to support the mobile power unit 100. For example, the engine 120 may include a starter 121 that is used to start the engine 120. A gearbox 130 may include a gearbox lubrication pump 138 that provides lubrication to the gearbox 130. The mobile power unit 100 also may include a drive lubrication pump 180 that provides lubrication to drive equipment installed in a drive equipment receiver 190. The drive equipment receiver 190 may be a recess in an upper surface of the transportation platform 110 that is sized to receive the drive equipment therein. The embodiment of the mobile power unit 100 further may include other auxiliary equipment in the form of cooling or heating fans, controllers, and pumps. The auxiliary equipment of the mobile power unit 100 may be driven by deck engines or may be electrified as detailed herein.

The pump 200 and the electrical generator 300 may be secured to a skid 220, 320, as will be understood by those skilled in the art, that provides for a stable base for the pump 200 or the electrical generator 300 and allows for the pump 200 or the electrical generator 300 to be lifted from and installed or mounted within the drive equipment receiver 190 of the mobile power unit 100. The skid 220, 320 may be constructed from a structural steel, e.g., AISI 1018 steel. The skid 220, 320 may include alignment features that align the skid 220, 320 within the drive equipment receiver 190 such that drive components and/or auxiliary equipment of the pump 200 or the generator 300 are aligned with the components of the mobile power unit 100, e.g., the engine 120. The skids 220, 320 may include lifting slots 225, 325 positioned therein that are sized to be engaged by components of a lifting device, e.g., a fork of a forklift, as would be appreciated by one skilled in the art, such that the respective skid 220, 320, including a pump 220 or generator 300, to be lifted onto or removed from the drive equipment receiver 190 of the mobile power unit 100. The skid 220, 320 may include auxiliary components that support operation of the respective one of the pump 200 or the electrical generator 300.

In some embodiments, the pump 200 or the electrical generator 300 may include lifting loops 210, 310, respectively, that allow for lifting of the pump 200 or the electrical generator 300 by a crane or other lifting device, as would be appreciated by one skilled in the art, to be lifted onto or removed from the drive equipment receiver 190 of the mobile power unit 100. The lifting loops 210, 310 may be secured to the skids 220, 320 or to a body of the pump 200 or the generator 300. Having both the lifting loops 210, 310 and the lifting slots 215, 315 allow for removal and installation of the pump 200 or the electrical generator 300 in a field or in a shop environment.

Figure 6:
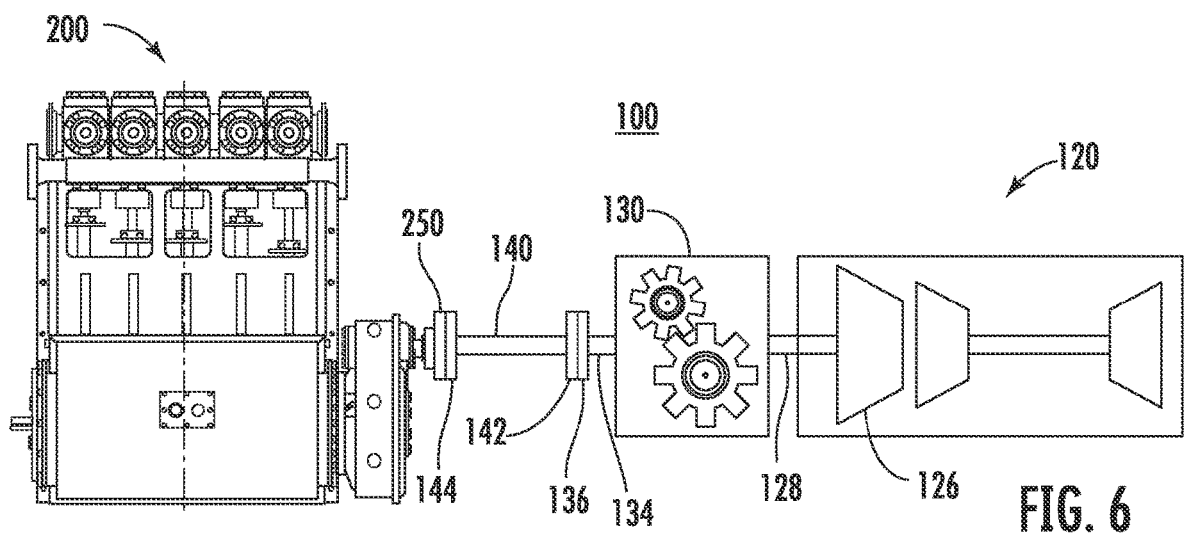
FIG. 6 is schematic view of a mobile power unit driving a reciprocating fracturing pump according to an embodiment of the present disclosure.

FIG. 6 schematically illustrates an embodiment of the mobile power unit 100 with an engine 120 connected to a pump 200 that is installed in the drive equipment receiver 190 of the mobile power unit 100. The engine 120 includes a power end 126 that directly drives an engine output shaft 128. The engine output shaft 128 is coupled to a reduction gearbox 130 such that a speed of rotation of the engine output shaft 128 is stepped down to a speed of rotation of a gearbox output shaft 134 of the gearbox 130 that is suitable for a hydraulic fracturing pump, e.g., pump 200. For example, a speed of rotation of the engine output shaft 128 of the engine 120 may be 16,500 RPM and a speed of rotation of the gearbox output shaft 134 of the gearbox 130 that is suitable for the pump 200 may be 1500 RPM such that a ratio of the reduction gearbox 130 is an 11:1 reduction. The reduction gearbox 130, for example, in some embodiments, may have a ratio in a range of 5:1 to 20:1 depending on the specifications of the engine 120 and the pump 200 to be driven by the engine 120. It will be appreciated that as the rotation speed of the engine output shaft 128 is stepped down to the rotation speed of the gearbox output shaft 134 at the ratio of the gearbox 130 that the torque of the output shaft 128 is stepped up to torque of the output shaft 134 at the inverse of the ratio, e.g., 1:11 step up for a 11:1 step down.

The gearbox output shaft 134 of gearbox 130 includes an output flange 136 that is coupled to an input flange 142 of a drive shaft 140 such that the drive shaft 140 is directly driven by the engine 120 via the gearbox 130. The drive shaft 140 includes an output flange 144 that releasably and selectively may be connected to an input shaft 250 of the pump 200 such that the pump 200 is directly driven by the engine 120 via the drive shaft 140.

Figure 7:
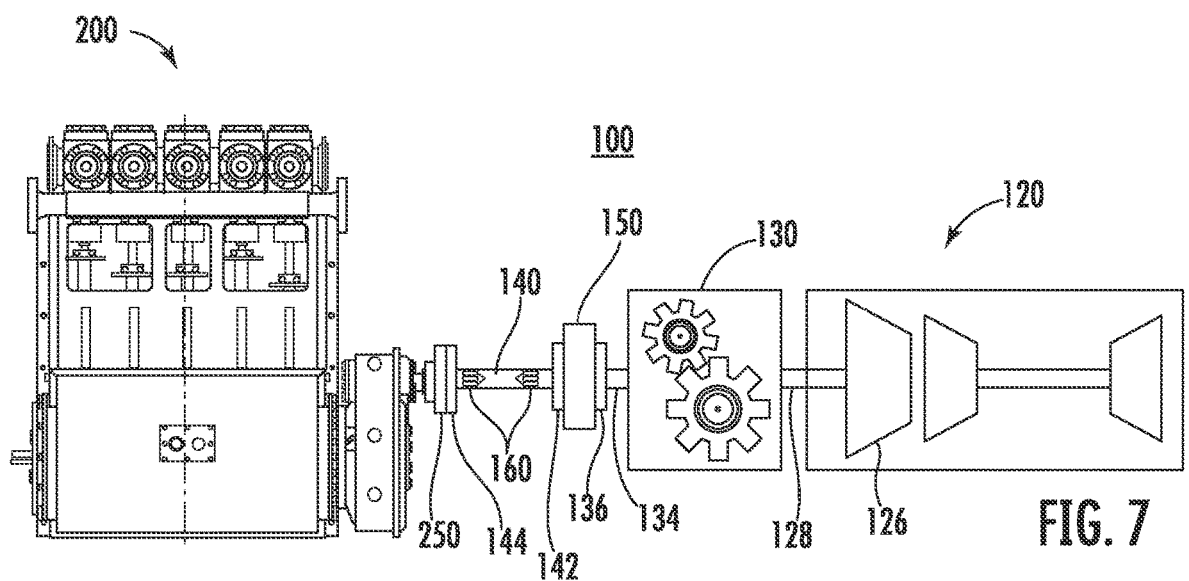
FIG. 7 is schematic view of a mobile power unit driving a reciprocating fracturing pump including a torsional vibration dampener and torque sensor according to an embodiment of the present disclosure.

FIG. 7 schematically illustrates an embodiment of a mobile power unit 100 with the engine 120 connected to the pump 200 that is installed in the drive equipment receiver 190 of the mobile power unit 100 such that the pump 200 is driven by the engine 120 via the drive shaft 140 in a manner as detailed above. The drive shaft 140 includes a torsional vibration damper (TVD) system 150 and a torque sensor 158, as will be understood by those skilled in the art. The TVD system 150 may dampen torque variations from the engine 120 to the pump 200 and/or may dampen reaction torque variations from the pump 200 to the engine 120. The TVD system 150 may prevent or reduce torque variations experienced by the engine 120, the gearbox 130, the drive shaft 140, and/or the pump 200 such that a service interval or the service life of the engine 120, the gearbox 130, the drive shaft 140, and/or the pump 200 may be extended. The drive shaft 140 also may include one or more torque sensors 160 installed thereon that measure a torque of the drive shaft 140. The torque sensors 160 may provide a signal to one or more controllers of the mobile power unit 100, e.g., a controller of the engine 120 or a controller of the pump 200. The controllers of the mobile power unit 100 or the torque sensors 160 may provide a signal to the supervisory control unit 30 (FIG. 1) indicative of the torque of the drive shaft 140. The torque of the drive shaft 140 may be used in one or more control algorithms for the engine 120.

Figure 8:
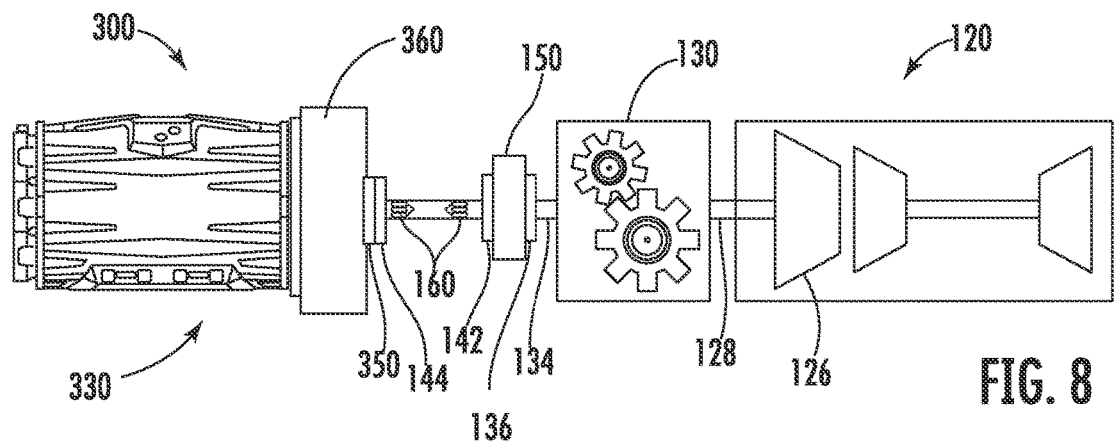
FIG. 8 is schematic view of a mobile power unit driving a generator including a torsional vibration dampener and torque sensor according to an embodiment of the present disclosure.

FIG. 8 schematically illustrates an embodiment of a mobile power unit 100 with the engine 120 connected to an electrical generator 300 that is installed in the drive equipment receiver 190 of the mobile power unit 100 such that the electrical generator 300 is driven by the engine 120 via the drive shaft 140. Specifically, the generator 300 includes an alternator 330 that rotates to generate alternating current (AC) electrical power which is suitable for the units 410, 420, 430 (FIG. 1), the auxiliary equipment of the mobile power units 100a, or the supervisory control unit 30 (FIG. 1). The speed of rotation of the alternator 330 that is suitable for generation of electrical power depends on the number of poles of the alternator 330 and the frequency of the AC power as represented by the following equation:

$$f = \frac{P \cdot N}{120}$$

where f is the output frequency in hertz (Hz), P is the number of poles, and N is the RPM of the alternator. As most electrical equipment in the United States operates at a frequency of 60 hertz (Hz), the rotational speed of the alternator 330 to provide AC power 60 Hz, for example, may be 3600 RPM for a 2-pole configuration and 1800 RPM for a 4-pole configuration. Those skilled in the art recognize that other speeds may be suitable for rotation of the alternator 330 depending on the desired frequency of the AC power, e.g., 50 Hz or 60 Hz, or the number of poles of the alternator, e.g., 2, 4, 6, 8, 10 poles.

The electrical generator 300 includes an input shaft 350 that releasably couples or otherwise connects to the output flange 144 of the drive shaft 140. As the electrical generator 300 may be a selective replacement for the pump 200, and the gearbox 130 has a fixed reduction ratio in a range of 5:1 to 20:1, e.g., 11:1, based on the speed requirements of the pump 200, the drive shaft 140 has a maximum speed of rotation of 1500 RPM. This results in the speed of rotation of the drive shaft 140 being less that what is required by the alternator 330 of the electrical generator 300 as detailed above with respect to a 2-pole or 4-pole configuration of the alternator 330. For this reason, the electrical generator 300 includes a step up generator gearbox 360 to increase the speed of rotation of the input shaft 350 to a speed of rotation that is suitable for the electrical generator 300. The ratio of the generator gearbox 360 ratio is set based on keeping the engine running at as high of a load and speed as possible and the number of poles of the electrical generator 300. As the input speed of the drive shaft 140 has a maximum speed of rotation of 1500 RPM, the generator gearbox 310 may have a ratio of 1:2.5 which allows for the speed of rotation of the electrical generator 300 to be 1800 RPM or 3600 RPM depending on the number of poles of the generator 300 installed on the mobile power unit 100. However, other ratios in a range of 1:1.25 to 1:5 may be used based on a desired speed of rotation of the electrical generator 300 as will be understood by those skilled in the art. Those skilled in the art appreciate that the speed of the engine 120 may be controlled by the supervisory control unit 30. Including a generator gearbox 360 which may allow for the electrical generator 300 selectively to be changed with the pump 200 by releasably coupling or connecting to the drive shaft 140 without changing the ratio of the reduction gearbox 130 of the engine 120. By not requiring the changing of the reduction gearbox 130 or requiring the reduction gearbox 130 to have multiple settings, one for the pump 200 and one for the generator 300, the efficiency of the reduction gearbox 130 may be increased and/or the complexity of changing the drive equipment may be simplified.

The alternator 330 of the electrical generator 300 is designed and sized based on the electrical demands of the fracturing fleet, e.g., the power demands of the well pad layout. As detailed above, when the alternator 330 is providing electrical power for the units 410, 420, 430 (FIG. 1), the electrical power requirement is 1,790 kW, and when the engine 120 is a 5,100 horsepower engine, the engine 120 may be capable of providing 3,800 kW of energy. Thus, the alternator 330 should be sized to generate at least 1,800 kW and to be capable of generating 3,800 kW when required. For example, when auxiliary equipment of the mobile power units 100a also are provided with electrical power from one or more generators 300.

Figure 9:
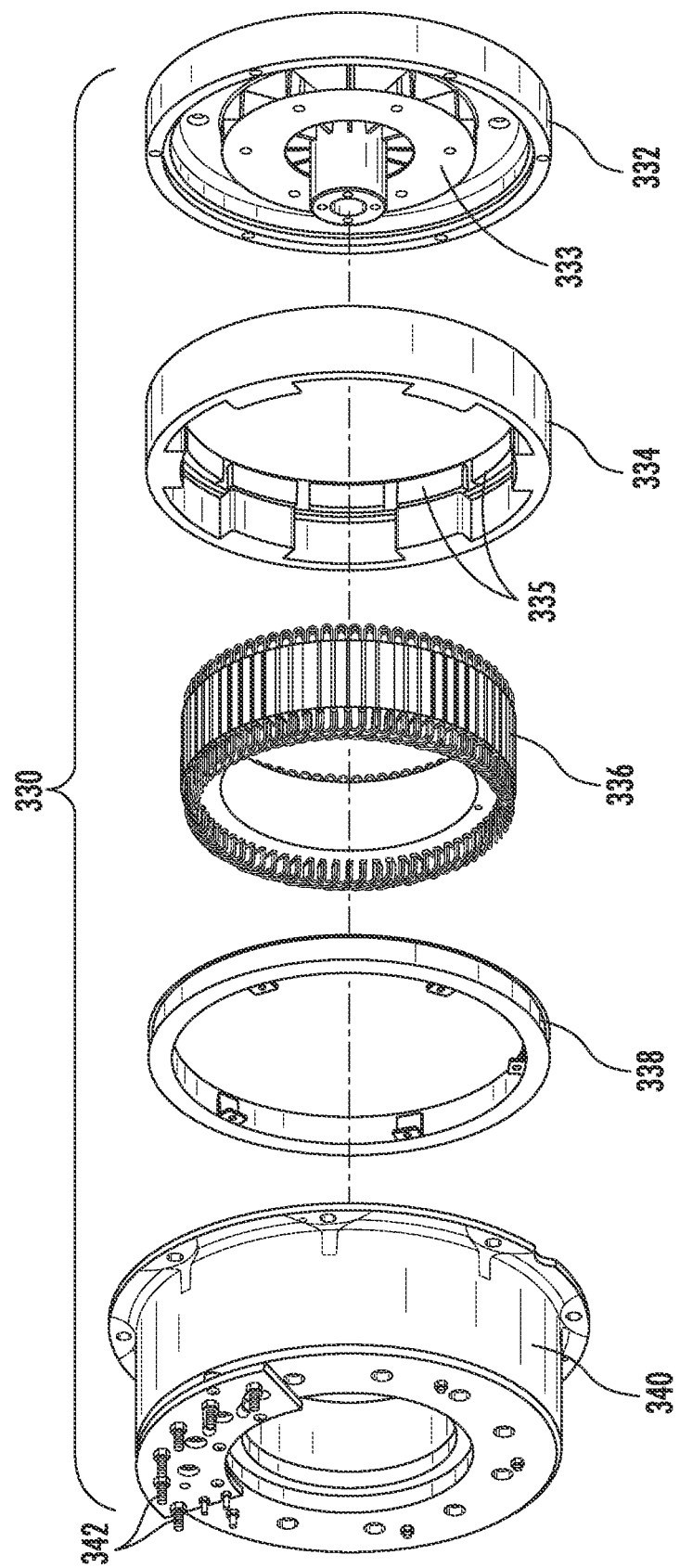
FIG. 9 is an exploded perspective view, with parts separated, of an alternator of an electrical generator of a mobile power unit of FIG. 8 according to an embodiment of the present disclosure.

FIG. 9 illustrates a construction of an exemplary alternator 330 in an exploded perspective view as provided in accordance with embodiments of this disclosure. The alternator 330 may be a permanent magnet alternator and more specifically, an AC synchronous alternator in which the stator and the rotor spin at the same speed. Such an alternator may have increased efficiency when compared to other alternators and does not require electrical power to the rotor to generate electrical power. As shown, the alternator 330 includes a rotor mount 332, a solid rotor 334, a stator 336, a field coil 338, and a housing 440. The rotor mount 332 is attached to an output shaft of the generator gearbox 360 (FIG. 8) such that the rotor mount 332 rotates at the output speed of the generator gearbox 360. The rotor mount 332 may include a blower 333 that includes vanes to direct fluid flow within the alternator 330 to cool internal components of the alternator 330. The rotor 334 is mounted to the rotor mount 332 such that the rotor 334 is rotatably fixed to the rotor mount 332. The rotor 334 may be a solid rotor and includes permanent magnets 335 mounted therein. The rotor 334 may include 12 permanent magnets 335 which may be NdFeB magnets, for example, as will be understood by those skilled in the art. The stator 336 is mounted to the rotor mount 332 within the rotor 334 such that the stator 336 rotates in concert with the rotor 334. The stator 336 may be a 6-phase stator, for example. The field coil 338 is mounted to the housing 340 about the stator 336 such that as the rotor 334 and the stator 336 rotate, AC power is transferred to terminals 342 of the housing 340. The housing 340 is disposed over the rotor mount 332, the solid rotor 334, the stator 336, and the field coil 338 such that the rotor mount 332, the solid rotor 334, the stator 336, and the field coil 338 rotate within the housing 340.

As shown in FIG. 5, embodiments of the alternator 330 also may require a cooling system 370 to cool internal components of the alternator 330. In some embodiments, the cooling system 370 includes a coolant pump 372 that circulates fluid through the alternator 330 to cool internal components thereof. The fluid may be air or glycol water, as will be understood by those skilled in the art. In certain embodiments, the cooling system 370 of the alternator 330 is self-sufficient such that the cooling system 370 is powered by the alternator 330 when the alternator 330 generates electrical power. In particular embodiments, the cooling system 370 of the alternator 330 requires external power to power the cooling system 370. In such embodiments, the cooling system 370 may be powered by a lubrication system 180 of the mobile power unit 100 (FIG. 4) that is configured to cool the pump 200 when the pump 200 is installed on the mobile power unit 100. The lubrication system 180 may include a changeover valve to be compatible with the cooling pump 372 of the generator 300. The cooling system 370 may require a coolant storage tank 374 which may be mounted to the skid 320 or the alternator 330 such that the cooling system 370 and the coolant storage tank is part of the electrical generator 300 and is installed with the electrical generator 300.

Figure 10:
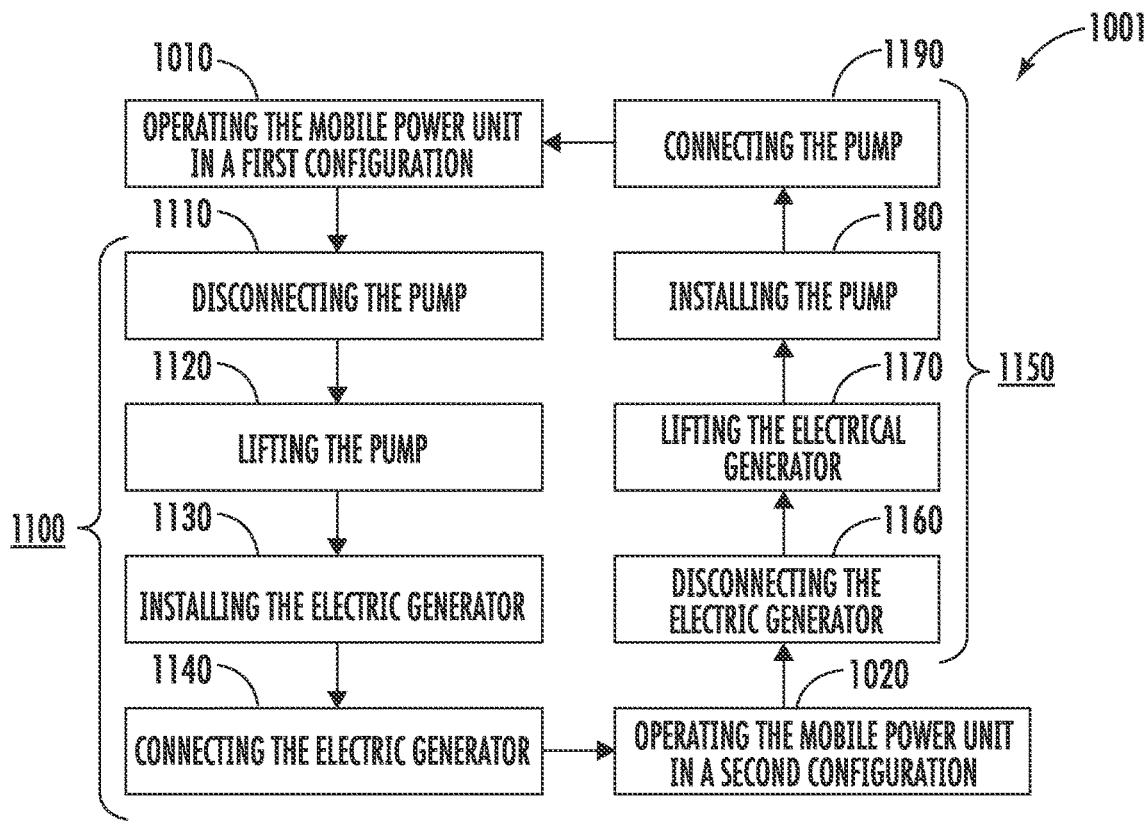
FIG. 10 is a flow chart of a method of changing drive equipment of a mobile power unit according to an embodiment of the disclosure.

FIG. 10 illustrates a method 1001 of changing a power device of a mobile power unit in accordance with exemplary embodiments of the present disclosure with reference to the mobile power unit of FIGS. 3-5. As described in greater detail below, the method 1001 includes a mobile power unit 100 driving a pump 200 in a first configuration (Step 1010), an electrical generator 300 in a second configuration (Step 1020), and changing the pump 200 or the electrical generator 300 for the other of the pump 200 or the electrical generator 300 (Step 1100). The method 1001 may include receiving a signal indicative of an electrical demand, an electrical supply, a fluid requirement, or a fluid supply of a well pad site. Changing the mobile power unit 100 between the first configuration and the second configuration may occur at least in part as a result of analyzing or determining that the electrical demand of the well pad site is greater than the electrical supply, that a fluid supply is greater than a fluid requirement of the well pad site, that an electrical supply is greater than an electrical demand of the well pad site, or that the fluid requirement of the well pad site is greater than the fluid supply.

In the first configuration, a gas turbine engine 120 of the mobile power unit 100 drives the pump 200 to provide high pressure fluid (Step 1010). The pump 200 is connected to a drive shaft 140 of the mobile power unit 100. The drive shaft 140 may have a maximum speed of rotation in a range of 1000 RPM to 1700 RPM. Operating the mobile power unit 100 in the first configuration may include operating the gas turbine engine 120 on field gas, for example.

The method 1001 may include selectively interchanging the pump 200 of the mobile power unit 100 for the electrical generator 300 (Step 1100). Interchanging the pump 200 for the electrical generator 300 may include disconnecting the pump 200 from an output flange 144 of the drive shaft 140 (Step 1110) before lifting a skid 220 that includes the pump 200 from a drive equipment receiver 190 of a transportation platform 110 of the mobile power unit 100 (Step 1120). Lifting the skid 220 may include lifting the skid 200 with a crane or a forklift. With the pump 200 removed, a skid 320 including the electrical generator 300 is installed into the drive equipment receiver 190 of the transportation platform 110 (Step 1130). With the skid 320 installed in the drive equipment receiver 190, the electrical generator 300 is connected to the output flange 144 of the drive shaft 140 (Step 1140). Interchanging the pump 200 for the electrical generator 300 may occur at a well pad or at a plant.

With the electrical generator 300 connected to the output flange 144, the mobile power unit 100 is operated in a second configuration in which the gas turbine engine 120 drives the electrical generator 300 (Step 1020), e.g., instead of the pump 200, to provide electrical power. In the second configuration, the mobile power unit 100 may provide electrical power to a blender unit 410, a hydration unit 420, or a chemical additive unit 430 of a well pad 1000. Additionally or alternatively, in the second configuration, the mobile power unit 100 may provide electrical power to auxiliary equipment of another mobile power unit 100 which includes a gas turbine engine 120 driving a hydraulic fracturing pump 200. Operating the mobile power unit 100 in the second configuration may include operating the gas turbine engine 120 on field gas.

In the second configuration, the method 1001 may include monitoring and controlling the electrical generator of the first mobile power unit 100 with a supervisory control unit 30 (FIG. 1). As described in greater detail below with respect to method 1200, the supervisory control unit 30 may monitor and control delivery of a high pressure fluid of a second mobile power unit having a gas turbine engine driving a pump simultaneously with monitoring and controlling the first mobile power unit in the second configuration.

The method 1001 may include selectively interchanging the electrical generator 300 of the mobile power unit 100 for the pump 200 (Step 1150). Interchanging the electrical generator 300 for the pump 200 may include disconnecting the electrical generator 300 from the output flange 144 of the drive shaft 140 (Step 1160) before lifting a skid 220 that includes the electrical generator 300 from a drive equipment receiver 190 of a transportation platform 110 of the mobile power unit 100 (Step 1170). Lifting the skid 220 may include lifting the skid 200 with a crane or a forklift. With the electrical generator 300 removed, a skid 220 including the pump 200 is installed into the drive equipment receiver 190 of the transportation platform 110 (Step 1180). With the skid 220 installed in the drive equipment receiver 190, the pump 200 is connected to the output flange 144 of the drive shaft 140 (Step 1190). Interchanging the electrical generator 300 for the pump 200 may occur at a well pad or at a plant.

Figure 11:
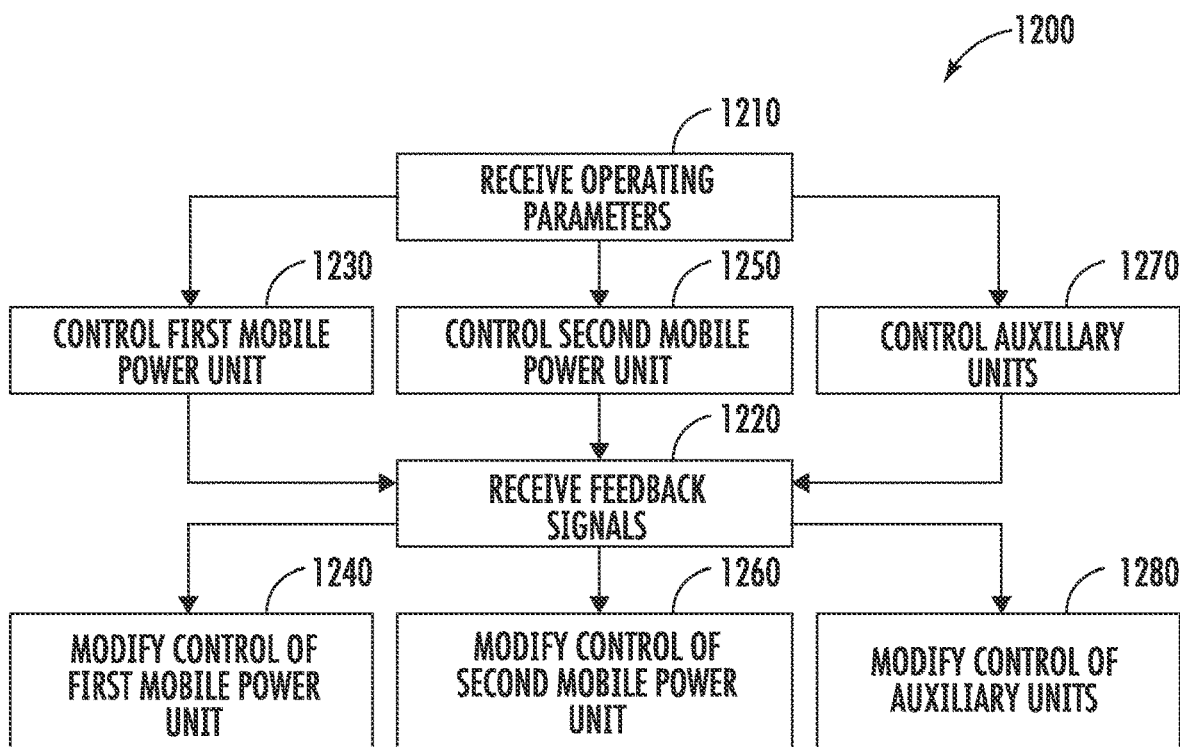
FIG. 11 is a flow chart of a method of controlling a well pad according to an embodiment of the disclosure.

FIG. 11 shows a method 1200 of controlling a well pad in accordance with exemplary embodiments of the present disclosure with reference to the well pad 1000 of FIG. 1. The method 1200 includes operating a supervisory control unit 30 to control a first mobile power unit 100, to control a second mobile power unit 100, and to control a blender unit 410, a hydration unit 420, or a chemical additive unit 430.

Operating the supervisory control unit 30 includes receiving operating parameters of the well pad 1000 at the supervisory control unit 30 (1210). In response to receiving operating parameters, the supervisor control unit 30 provides control signals to the first mobile power unit 100 to control the first mobile power unit 100 (Step 1230), provides control signals to the second mobile power unit 100 (Step 1250), and provides control signals to the blender unit 410, the hydration unit 420, or the chemical additive unit 430 (Step 1270).

The supervisory control unit 30 may receive feedback signals from first mobile power unit 100 (Step 1220) and may modify control signals provided to the first mobile power unit 100 in response to the feedback signals (Step 1240). For example, the supervisory control unit 30 may change a supply of air or fuel to the gas turbine engine 120 such that the gas turbine engine 120 changes power delivery to the electrical generator 300 based on energy demands of the well pad 100. The supervisory control unit 30 may calculate energy demands of the well pad 1000 by monitoring or receiving feedback from the first mobile power unit 100, the second mobile power unit 100, and a blender unit 410, a hydration unit 420, or a chemical additive unit 430. In some embodiments, the method 1200 may include the first mobile power unit 100 providing power to a supervisory control vehicle that includes the supervisory control unit 30.

The supervisory control unit 30 may receive feedback signals from the second mobile power unit 100 (Step 1220) and may modify control signals provided to the second mobile power unit 100 in response to the feedback signals (Step 1260). For example, the supervisory control unit 30 may change the supply of air or fuel to the gas turbine engine 120 of the second mobile power unit 100 to change an amount or pressure of a high pressure fluid from the pump 200 in response to the feedback signals of the second mobile power unit 100.

The supervisory control unit 30 may receive feedback signals from the blender unit 410, the hydration unit 420, or the chemical additive unit 430 (Step 1220) and may modify control signals provided to the units 410, 420, or 430 based on the feedback signals (Step 1280). For example, the supervisory control unit 30 may change an amount of fluid provided to the pump 200 by a respective one units 410, 420, or 430. The supervisory control unit 30 may control the units 410, 420, 430 by changing a supply or electrical power from the electrical generator 300 of the first mobile power unit 100.

Figure 12:
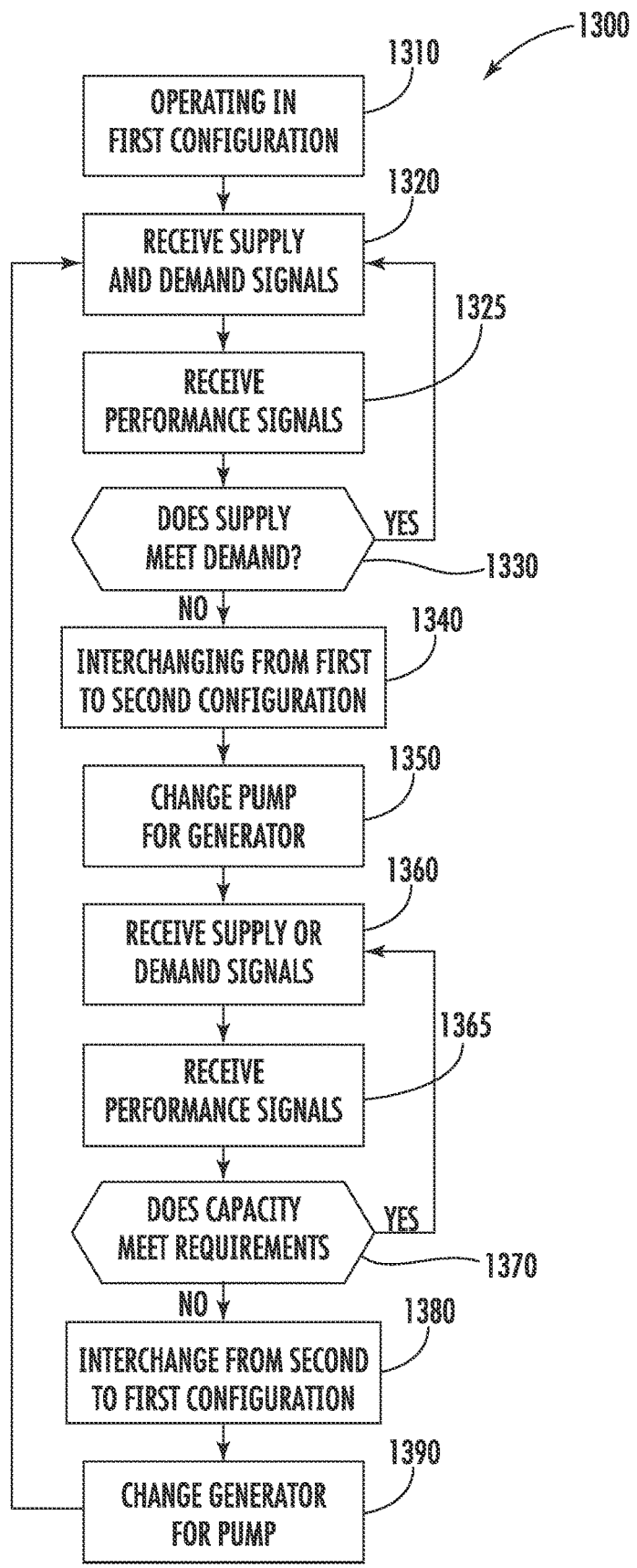
FIG. 12 is a flow chart of a method of changing drive equipment of a mobile power unit according to an embodiment of the disclosure.

FIG. 12 illustrates a method 1300 of changing drive equipment of a mobile power unit in accordance with exemplary embodiments of the present disclosure with reference to the mobile power unit of FIGS. 3-5. The method 1300 includes operating a mobile power unit 100 in a first configuration (Step 1310), receiving one or more signals indicative of an electrical demand or fluid requirements of a well pad site (Step 1320), determining that the electrical demand of the well pad site 1000 is greater than an electrical supply or that a fluid capacity is greater than the fluid requirements (Step 1330), and interchanging the first mobile power unit 100 from a first configuration to a second configuration (Step 1340).

Operating the first mobile power unit 100 in the first configuration (Step 1310) includes the first mobile power unit 100 driving a pump 200 to provide high pressure fluid to the well pad site 1000. The mobile power unit 100 includes a gas turbine engine 120 that drives the pump 200 to provide the high pressure fluid. The pump 200 is connected to a drive shaft 140 of the mobile power unit 100 which has a reduction gearbox 130 such that the drive shaft 140 may have a maximum speed of rotation in a range of 1000 RPM to 1700 RPM. Operating the mobile power unit 100 in the first configuration may include operating the gas turbine engine 120 on field gas, for example.

When the first mobile power unit 100 is operating in the first configuration, a supervisory control unit 30 of the well pad site 1000 receives demand signals from equipment of the well pad site 1000 and input from the operators at the well pad site 1000 that are indicative of an electrical demand and fluid requirements of the well pad site 1000 (Step 1320). In addition, the supervisory control unit 30 may receive performance signals from equipment of the well pad site 1000 (e.g., mobile power units 100, pumps 200, generators 300, or auxiliary units 410, 420, 430) (Step 1325). The supervisory control unit 30 may display the electrical demand and the fluid requirements of the well pad site 1000 and display the current electrical supply and fluid supply of the well pad site 1000 based on the signals received.

The operator or the supervisory control unit 30 may compare the electrical demand to the electrical supply or the fluid requirements to the fluid capacity (Step 1330). When the operator or the supervisory control unit 30 determines that the electrical demand of the well pad site 1000 is greater than the electrical supply or that the fluid capacity is greater than the fluid requirements, the first mobile power unit 100 may be interchanged from the first configuration to a second configuration (Step 1340). The decision to interchange the first mobile power unit 100 may be made to optimize electrical supply or fluid capacity or to allow for maintenance of other mobile power units 100. When the electrical demand is less than the electrical supply and the fluid capacity is less than the fluid requirements, the first mobile power unit 100 may remain in the first configuration.

When the first mobile power unit 100 is interchanged to the second configuration, the pump 200 of the first mobile power unit 100 is changed for an electrical generator 300 (Step 1350). In the second configuration, the electrical generator 300 is connected to the drive shaft 140 to produce electrical energy for the well pad site 1000. The electrical generator 300 includes a generator gearbox 360 to at least partially offset the reduction gearbox 130. The electrical generator 300 may provide electrical power to auxiliary units such as a blender unit 410, a hydration unit 420, or a chemical additive unit 430.

When the first mobile power unit 100 is operating in the second configuration, the supervisory control unit 30 of the well pad site 1000 may continue to receive demand signals from equipment of the well pad site 1000 and input from the operators at the well pad site 1000 that are indicative of an electrical demand and fluid requirements of the well pad site 1000 (Step 1360). In addition, the supervisory control unit 30 may receive performance signals from equipment of the well pad site 1000 (e.g., mobile power units 100, pumps 200, generators 300, or auxiliary units 410, 420, 430) (Step 1365). The supervisory control unit 30 may display the electrical demand and the fluid requirements of the well pad site 1000 and display the current electrical supply and fluid supply of the well pad site 1000 based on the signals received.

The operator or the supervisory control unit 30 may compare the electrical demand to the electrical supply or the fluid requirements to the fluid capacity (Step 1370). When the operator or the supervisory control unit 30 determines that the fluid requirements of the well pad site 1000 is greater than the fluid capacity or that the electrical supply is greater than the electrical demand, the first mobile power unit 100 may be interchanged from the first configuration to a second configuration (Step 1380). The decision to interchange the first mobile power unit 100 may be made to optimize electrical supply or fluid capacity or to allow for maintenance of other mobile power units 100. When the fluid requirement is less than the fluid capacity and the electrical supply is less than the electrical demand, the first mobile power unit 100 may remain in the second configuration.

When the first mobile power unit 100 is interchanged to the first configuration, the electrical generator 300 of the first mobile power unit 100 is changed for a pump 200 (Step 1390). As detailed above, in the first configuration, the pump 200 is connected to the drive shaft 140 to produce fluid capacity for the well pad site 1000. Interchanging the first mobile power unit 100 between the first configuration and the second configuration may occur at a well pad site 1000.

This is a divisional of U.S. Non-Provisional application Ser. No. 17/301,305, filed Mar. 31, 2021, titled "DRIVE EQUIPMENT AND METHODS FOR MOBILE FRACTURING TRANSPORTATION PLATFORMS," which claims priority to and the benefit of, under 35 U.S.C. § 119(e), U.S. Provisional Application No. 62/705,055, filed Jun. 9, 2020, titled "DRIVE EQUIPMENT AND METHODS FOR MOBILE FRACTURING TRANSPORTATION PLATFORMS," the disclosures of which are incorporated herein by reference in their entireties.

The foregoing description of the disclosure illustrates and describes various exemplary embodiments. Various additions, modifications, changes, etc., may be made to the exemplary embodiments without departing from the spirit and scope of the disclosure. It is intended that all matter contained in the above description or shown in the accompanying drawings shall be interpreted as illustrative and not in a limiting sense. Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed:

1. A mobile power unit having a transportation platform, the mobile power unit comprising:
   a gas turbine engine mounted to the transportation platform and having an engine output shaft that rotates to provide energy from the gas turbine engine;
   a drive shaft connected to the gas turbine engine on the transportation platform;
   a reduction gearbox positioned on the transportation platform and disposed between the engine output shaft and the drive shaft, the reduction gearbox reducing a speed of rotation of the engine output shaft to a speed of rotation of the drive shaft, the reduction gearbox having a ratio in a range of 5:1 to 20:1; and
   a drive equipment receiver including drive equipment connected to the drive shaft on the transportation platform, the drive equipment receiver having a first configuration when a pump is installed so as to define the drive equipment in the drive equipment receiver so that the pump is driven by the drive shaft attached to the gas turbine engine on the transportation platform, the pump being configured to provide high pressure fluid when driven by the gas turbine engine, the drive equipment receiver also having a second configuration when an electrical generator having a generator gearbox is installed so as to define the drive equipment in the drive equipment receiver so that the electrical generator is driven by the generator gearbox, which is driven by the drive shaft attached to the gas turbine engine on the transportation platform, the electrical generator configured to provide electrical power when driven by the gas turbine engine and configured so that the generator gearbox steps up a speed of rotation of the drive shaft, the generator gearbox at least partially offsetting the reduction gearbox.

2. The mobile power unit according to claim 1, wherein the electrical generator is secured to a skid, the skid selectively securable to the drive equipment receiver so that the electrical generator is aligned with the drive shaft.

3. The mobile power unit according to claim 1, wherein the generator gearbox having a ratio in a range of 1:1.25 to 1:5.

4. The mobile power unit according to claim 1, wherein the electrical generator includes a permanent magnet alternator such that the electrical generator converts rotation of the drive shaft into electrical power.

5. The mobile power unit according to claim 4, wherein the electrical generator includes a self-sufficient cooling system installed in the second configuration, the cooling system configured to circulate cooling fluid through the electrical generator.

6. The mobile power unit according to claim 4, wherein the electrical generator includes a cooling system having a generator cooling pump configured to circulate a cooling fluid through the electrical generator, the generator cooling pump powered by a lubrication pump of the mobile power unit, the lubrication pump mounted to the transportation platform outside of the drive equipment receiver.

7. The mobile power unit according to claim 1, wherein the pump and the electrical generator include lifting loops, the lifting loops configured to be engaged by a crane to lift the pump or the electrical generator from or into the drive equipment receiver such that the mobile power unit is field interchangeable between the first configuration and the second configuration.

* * * * *